United States Patent
Durvasula et al.

(10) Patent No.: US 12,045,756 B2
(45) Date of Patent: Jul. 23, 2024

(54) MACHINE LEARNING METHODS AND SYSTEMS FOR CATALOGING AND MAKING RECOMMENDATIONS BASED ON DOMAIN-SPECIFIC KNOWLEDGE

(71) Applicant: MCKINSEY & COMPANY, INC., New York, NY (US)

(72) Inventors: Sastry VSM Durvasula, Phoenix, AZ (US); Rares Almasan, Phoenix, AZ (US); Hugo Sarrazin, Fort Lauderdale, FL (US); Neema Uthappa, Phoenix, AZ (US); Sriram Venkatesan, Princeton Junction, NJ (US); Jaspreet Singh, Fair Lawn, NJ (US); Sonam Jha, Short Hills, NJ (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 17/512,743

(22) Filed: Oct. 28, 2021

(65) Prior Publication Data

US 2023/0140828 A1 May 4, 2023

(51) Int. Cl.
*G06Q 10/0637* (2023.01)
*G06N 5/022* (2023.01)
(Continued)

(52) U.S. Cl.
CPC ....... *G06Q 10/06375* (2013.01); *G06N 5/022* (2013.01); *G06N 5/04* (2013.01); *G06Q 30/018* (2013.01)

(58) Field of Classification Search
CPC ....... H04L 63/20; G06N 20/00; G06F 16/951; G06F 21/6245; G06F 16/248;
(Continued)

(56) References Cited

U.S. PATENT DOCUMENTS

2008/0015913 A1* 1/2008 Courtney ............... G06Q 50/26
  705/7.28
2019/0303608 A1* 10/2019 Cohen ...................... G06N 3/08
(Continued)

FOREIGN PATENT DOCUMENTS

CN    110717843 A  * 1/2020

OTHER PUBLICATIONS

Tamilselvam, Srikanth G., et al. "Compliance Change Tracking in Business Process Services." arXiv preprint arXiv:1908.07190 (2019) [online], [retrieved on Jan. 5, 2023]. Retrieved from the Internet <https://arxiv.org/abs/1908.07190> (Year: 2019).*
(Continued)

*Primary Examiner* — Jerry O'Connor
*Assistant Examiner* — Michael R Koester
(74) *Attorney, Agent, or Firm* — MARSHALL, GERSTEIN & BORUN LLP; Randall G. Rueth

(57) ABSTRACT

ML methods and systems for cataloging and making recommendations based on domain-specific knowledge are disclosed. An example method includes: cataloging, using knowledge engines, data to develop knowledge repositories for respective domains; obtain current domain state data; obtain future domain state data; analyze, using first ML models, one or more of (i) data from the knowledge repositories, (ii) the first domain state data, and (iii) the second domain state data to identify a recommended set of one or more regulations, standards, policies and/or rules for a desired second domain state; analyze, using second ML models, (i) the recommended set and (ii) a current data and architecture state for a current computing environment to generate a summary of one or more cloud deployment options for migrating a current computing environment to a future computing environment for a future domain state; and cause the summary to be displayed on a computing device.

29 Claims, 20 Drawing Sheets

(51) Int. Cl.
*G06N 5/04* (2023.01)
*G06Q 30/018* (2023.01)

(58) Field of Classification Search
CPC ...... G06F 21/577; G06Q 30/02; G06Q 10/06; G06Q 20/384; G16H 10/60
See application file for complete search history.

(56) References Cited

U.S. PATENT DOCUMENTS

2020/0380381 A1* 12/2020 Aaron ................. G06F 9/44526
2021/0248252 A1*  8/2021 Darji ....................... G06F 3/062

OTHER PUBLICATIONS

Translation of CN-110717843-A (Year: 2020).*
U.S. Appl. No. 17/506,521, Machine Learning Techniques for Environmental Discovery, Environmental Validation, and Automated Knowledge Repository Generation, filed Oct. 20, 2021.
U.S. Appl. No. 17/506,536, Automated Cloud Data and Technology Solution Delivery Using Machine Learning and Artificial Intelligence Modeling, filed Oct. 20, 2021.

* cited by examiner

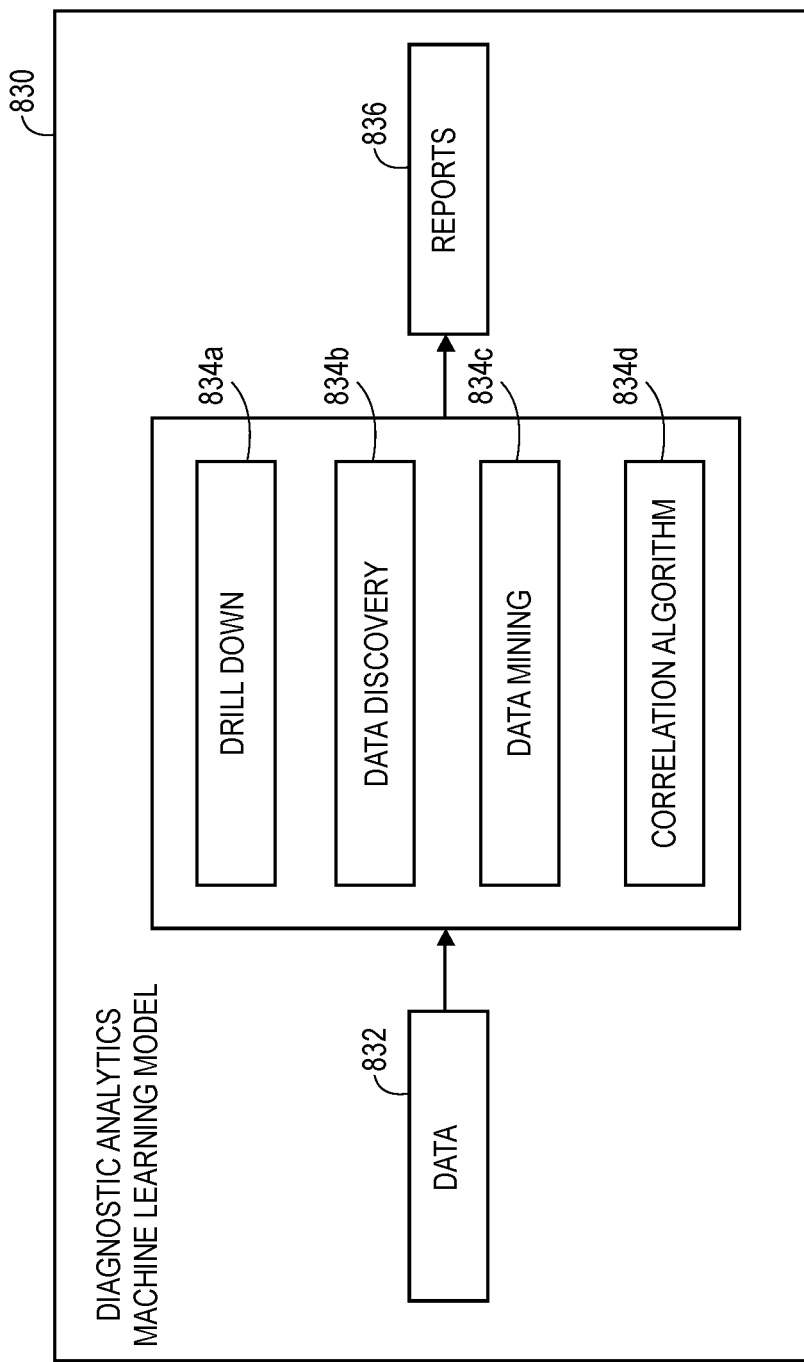

MACHINE LEARNING METHODS AND SYSTEMS FOR CATALOGING AND MAKING RECOMMENDATIONS BASED ON DOMAIN-SPECIFIC KNOWLEDGE

FIELD OF THE DISCLOSURE

The present disclosure is generally directed to techniques for making recommendations regarding business rules, policies, standards and regulations, and more particularly, for machine learning (ML) methods and systems for cataloging and making recommendations regarding business regulations, governance standards, rules and policies based on domain-specific knowledge.

BACKGROUND

Businesses may not be aware of the various business regulations, governance standards, rules and policies applicable to their specific domains (e.g., industry, function, business process, and geography), making it difficult for a business to flourish and sometimes causing them to have to pay huge fines for non-compliance. A domain expert may be able to contribute their knowledge on a particular industry (e.g., aerospace, finance, banking, etc.), on particular functions (e.g., supply chain management, operations, etc.) and/or geographies (e.g., North America, Europe, Asia, etc.). However, such knowledge often gets documented in documents and/or presentations, making it hard to search for relevant knowledge. Further, such knowledge is limited to the knowledge of the experts that were engaged and, thus, may not be useful when a business is thinking of changing domains and/or moving into new domains. For example, an enterprise might be embarking on a journey to move their workloads from an on-premise data center in the United States of America (USA) to a cloud platform hosted in China, where they have no domain knowledge about local regulations, governance, rules and policies. Integrating expert domain knowledge into a working solution has been found to be laborious, time-consuming, and expensive.

Accordingly, there is a need for ML methods and systems for cataloging and making recommendations regarding business regulations, governance standards, rules and policies based on domain-specific knowledge.

SUMMARY

In an embodiment, a computer-implemented method for cataloging and making recommendations based on domain-specific knowledge includes: collecting, using one or more network interfaces, data representative of business regulations, governance standards, rules and/or policies from a plurality of data sources; cataloging, using one or more knowledge engines, the collected data to develop a plurality of knowledge repositories for respective ones of a plurality of domains. The method further includes obtaining first domain state data representing one or more domains for a current domain state; and obtaining second domain state data representing one or more domains for a future domain state. The method analyzes, using one or more first machine learning (ML) models, one or more of (i) first data from the plurality of knowledge repositories, (ii) the first domain state data, and (iii) the second domain state data to identify a recommended set of one or more regulations, standards, policies and/or rules to be complied with for the future domain state. The method further analyzes, using one or more second ML models, (i) second data representing the recommended set of one or more business regulations, standards, policies and/or rules to be complied with for the future domain state and (ii) third data representing a current data and architecture state corresponding to a current computing environment to generate a summary of one or more cloud deployment options for migrating the current computing environment to a future computing environment for the future domain state based on the set of one or more regulations, standards, policies and/or rules to be complied with for the future domain state; and causes the summary of the one or more cloud deployment options to be displayed on a computing device.

In another embodiment, a computing system for cataloging and making recommendations based on domain-specific knowledge includes: one or more processors, and a non-transitory, computer-readable storage medium storing computer-readable instructions. The instructions, when executed by the one or more processors, cause the computing system to collect data representative of business regulations, governance standards, rules and/or policies from a plurality of data sources, and catalog, using one or more knowledge engines, the collected data to develop a plurality of knowledge repositories for respective ones of a plurality of domains. The instructions, when executed by the one or more processors, cause the system to also obtain first domain state data representing one or more domains for a current domain state, obtain second domain state data representing one or more domains for a future domain state, and analyze, using one or more first machine learning (ML) models, one or more of (i) first data from the plurality of knowledge repositories, (ii) the first domain state data, and (iii) the second domain state data to identify a recommended set of one or more regulations, standards, policies and/or rules to be complied with for the future domain state. The instructions, when executed by the one or more processors, cause the system to analyze, using one or more second ML models, (i) second data representing the recommended set of one or more business regulations, standards, policies and/or rules to be complied with for the future domain state and (ii) third data representing a current data and architecture state corresponding to a current computing environment to generate a summary of one or more cloud deployment options for migrating the current computing environment to a future computing environment for the future domain state based on the set of one or more regulations, standards, policies and/or rules to be complied with for the future domain state, and cause the summary of the one or more cloud deployment options to be displayed on a computing device.

In yet another embodiment, a non-transitory, computer-readable, storage medium stores computer-readable instructions that, when executed by one or more processing devices, cause a system to collect data representative of business regulations, governance standards, rules and/or policies from a plurality of data sources, and catalog, using one or more knowledge engines, the collected data to develop a plurality of knowledge repositories for respective ones of a plurality of domains. The instructions, when executed by the one or more processors, cause the system to also obtain first domain state data representing one or more domains for a current domain state, obtain second domain state data representing one or more domains for a future domain state, and analyze, using one or more first machine learning (ML) models, one or more of (i) first data from the plurality of knowledge repositories, (ii) the first domain state data, and (iii) the second domain state data to identify a recommended set of one or more regulations, standards, policies and/or rules to be complied with for the future domain state. The instructions, when executed by the one or more processors, cause the system to analyze, using one or more second ML models, (i) second data representing the recommended set of one or more business regulations, standards, policies and/or rules to be complied with for the future domain state and (ii) third data representing a current data and architecture state corresponding to a current computing environment to generate a summary of one or more cloud deployment options for migrating the current computing environment to a future computing environment for the future domain state based on the set of one or more regulations, standards, policies and/or rules to be complied with for the future domain state, and cause the summary of the one or more cloud deployment options to be displayed on a computing device

BRIEF DESCRIPTION OF THE DRAWINGS

The figures described below depict various aspects of the systems and methods disclosed therein. It should be understood that each figure depicts one embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present aspects are not limited to the precise arrangements and instrumentalities shown, wherein:

FIG. 8D is an exemplary block flow diagram depicting a computer-implemented method for training and/or operating another diagnostic analytics ML model, according to one aspect;

DETAILED DESCRIPTION

Figure 1:
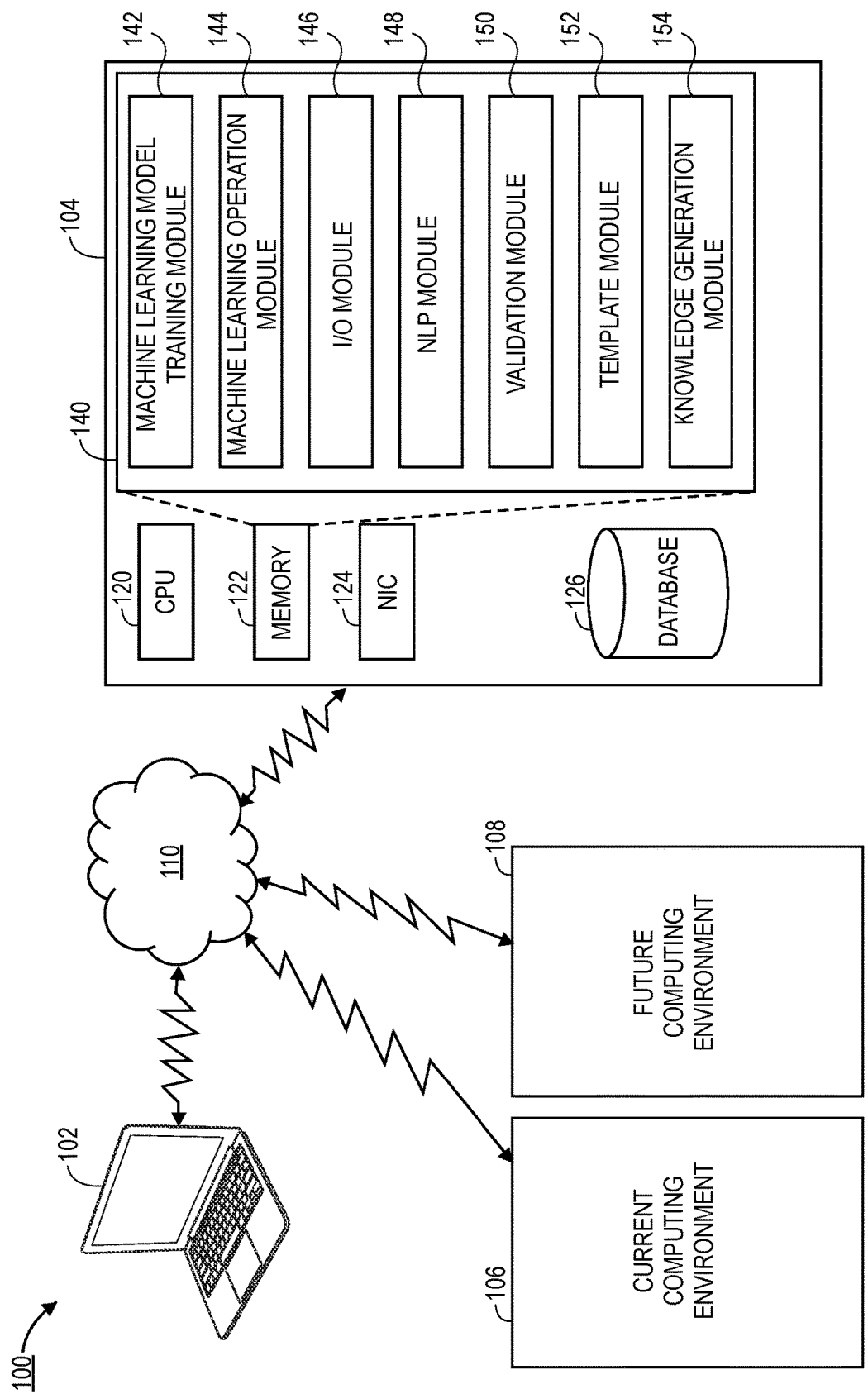
FIG. 1 depicts an exemplary computing environment in which cataloging and making recommendations based on domain-specific knowledge may be performed, in some aspects.

Reference will now be made in detail to non-limiting examples, some of which are illustrated in the accompanying drawings.

Overview

The aspects described herein relate to, inter alia, machine learning (ML) and/or artificial intelligence (AI) techniques for cataloging and making recommendations regarding business regulations, governance standards, rules and policies based on domain-specific knowledge, and, more particularly, to training and operating one or more ML/AI models for cataloging and making recommendations regarding business regulations, governance standards, rules and policies based on domain-specific knowledge.

Specifically, the present techniques facilitate the efficient and cost effective integration of domain and expert knowledge by converting it into domain knowledge building blocks that can be input into one or more ML/AI models. The present techniques are scalable, and can be leveraged to provide domain-driven recommendations to multiple and diverse clients. In various aspects, the ML models stitch together the domain and expert knowledge across various types of businesses and domains to deliver domain migration blue prints that are in compliance with industry, function, business process and geographic domains.

The ML/AI models of the present techniques may additionally leverage the domain knowledge building blocks to recommend a blend of services to stitch together for an efficient cloud delivery and/or cloud transformation that is contextual to a given set or sets of industry, function, business process and geography domains.

Still further, the ML/AI modules of the present techniques may continuously innovate by recommending improvement to existing domain knowledge blocks considering past outcomes, cost efficiencies and time to market. The ML/AI models may further suggest new reusable domain knowledge blocks based on any changes to regulations, governance standards, rules or polices, thereby providing a more efficient, cost effective and automated cloud delivery process.

In an example, a user inputs their current architecture state and indicates that the user wants to migrate their cloud computing system to a different country (e.g., from US to China) and/or wants to expand their system into a different country. The ML/AI model may identify a set of recommended, optional and/or mandatory rules, regulations, standards, and/or policies specific to cloud computing in China. In some aspects, the ML/AI models may then apply that set to the current architecture state, and determine what, if anything, needs to change about the current architecture state to comply with the Chinese regulations, standards, policies, rules, etc. The ML/AI models then provide a recommendation on cloud deployment options to adjust the current architecture state to comply with these regulations. In another example, the user inputs their current architecture state and that the user wants to migrate their system from aerospace to finance.

Exemplary Computing Environment

FIG. 1 depicts a computing environment 100 in which cataloging and making recommendations regarding business regulations, governance standards, rules and policies based on domain-specific knowledge may be performed, in accordance with various aspects discussed herein.

In the example aspect of FIG. 1, computing environment 100 includes client(s) 102, which may comprise one or more computers. In various aspects, client(s) 102 comprise multiple computers, which may comprise multiple, redundant, and/or replicated client computers accessed by one or more users. The example aspect of FIG. 1 further includes one or more servers 104. In further aspects, the servers 104 may be implemented as cloud-based servers, such as a cloud-based computing platform. For example, servers 104 may be any one or more cloud-based platform(s) such as Microsoft® Azure, Amazon Web Services™ (AWS™), Terraform, etc. The environment 100 may further include a current computing environment 106 representing a current computing environment (e.g., on-premise) of a customer and/or a current domain state, and/or a future computing environment 108 representing a future computing environment (e.g., a cloud computing environment, multi-cloud environment, etc.) and/or a future domain state of a customer. The environment 100 may further include an electronic network 100 communicatively coupling other aspects of the environment 100.

As described herein, in some aspects, servers 104 may perform the functionalities as discussed herein as part of a "cloud" network or may otherwise communicate with other hardware or software components within one or more cloud computing environments to send, retrieve, or otherwise analyze data or information described herein. For example, in aspects of the present techniques, the current computing environment 106 may comprise a customer on-premise computing environment, a multi-cloud computing environment, a public cloud computing environment, a private cloud computing environment, and/or a hybrid cloud computing environment. For example, the customer may host one or more services in a public cloud computing environment (e.g., Alibaba Cloud, Amazon Web Services™ (AWS™), Google® Cloud, IBM® Cloud, Microsoft® Azure, etc.). The public cloud computing environment may be a traditional off-premise cloud (i.e., not physically hosted at a location owned/controlled by the customer). Alternatively, or in addition, aspects of the public cloud may be hosted on-premise at a location owned/controlled by the customer. The public cloud may be partitioned using visualization and multi-tenancy techniques, and may include one or more of the customer's IaaS and/or PaaS services.

In some aspects of the present techniques, the current computing environment 106 of the customer may comprise a private cloud that includes one or more cloud computing resources (e.g., one or more servers, one or more databases, one or more virtual machines, etc.) dedicated to the customer's exclusive use. In some aspects, the private cloud may be distinguished by its isolation to hardware exclusive to the customer's use. The private clouds may be located on-premise of the customer, or constructed from off-premise cloud computing resources (e.g., cloud computing resources located in a remote data center). The private clouds may be third-party managed and/or dedicated clouds.

In still further aspects of the present techniques, the current computing environment 106 may comprise a hybrid cloud that includes multiple cloud computing environments communicatively coupled via one or more networks (e.g., the network 110). For example, in a hybrid cloud computing aspect, the current computing environment 106 may include one or more private clouds, one or more public clouds, a bare-metal (e.g., non-cloud based) system, etc. The future computing environment 108 may comprise one or more public clouds, one or more private clouds, one or more bare-metal systems/servers, and/or one or more hybrid clouds. The servers 104 may be implemented as one or more public clouds, one or more private clouds, one or more hybrid clouds, and/or one or more bare-metal systems/servers. For example, the servers 104 may be implemented as a private cloud computing environment that orchestrates the migration of a current computing environment 106 implemented as a first hybrid cloud (e.g., comprising two public clouds and three private clouds) to a future computing environment 108 implemented as a second hybrid cloud (e.g., comprising one public cloud and five private clouds).

The client device 102 may be any suitable device (e.g., a laptop, a smart phone, a tablet, a wearable device, a blade server, etc.). The client device 102 may include a memory and a processor for, respectively, storing and executing one or more modules. The memory may include one or more suitable storage media such as a magnetic storage device, a solid-state drive, random access memory (RAM), etc. A proprietor of migration techniques may access the environment 100 via the client device 102, to access services or other components of the environment 100 via the network 110.

The network 110 may comprise any suitable network or networks, including a local area network (LAN), wide area network (WAN), Internet, or combination thereof. For example, the network 106 may include a wireless cellular service (e.g., 4G). Generally, the network 110 enables bidirectional communication between the client device 102 and the servers 104; the servers 104 and the current computing environment 106; the servers 104 and the future computing environment 108, etc. As shown in FIG. 1, servers 104 are communicatively connected, via computer network 110 to the one or more computing environments 106 and 108 via network 110. In some aspects, network 110 may comprise a cellular base station, such as cell tower(s), communicating to the one or more components of the environment 100 via wired/wireless communications based on any one or more of various mobile phone standards, including NMT, GSM, CDMA, UMMTS, LTE, 5G, or the like. Additionally or alternatively, network 110 may comprise one or more routers, wireless switches, or other such wireless connection points communicating to the components of the environment 100 via wireless communications based on any one or more of various wireless standards, including by non-limiting example, the IEEE 802.11x family of standards (Wi-Fi®), a Bluetooth standard, or the like.

The one or more servers 104 may include one or more processors 120, one or more computer memories 122, one or more network interface controllers (NICs) 124 and an electronic database 126. The NIC 124 may include any suitable network interface controller(s), and may communicate over the network 110 via any suitable wired and/or wireless connection. The servers 104 may include one or more input device (not depicted) and may include one or more device for allowing a user to enter inputs (e.g., data) into the servers 104. For example, the input device may include a keyboard, a mouse, a microphone, a camera, etc. The NIC may include one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 110.

The database 126 may be a relational database, such as Oracle, DB2, MySQL, a NoSQL based database, such as MongoDB, or another suitable database. The database 126 may store data used to train and/or operate one or more ML/AI models. The database 126 may store runtime data (e.g., a customer response received via the network 110). In various aspects, server(s) 104 may be referred to herein as "migration server(s)." The servers 104 may implement client-server platform technology that may interact, via the computer bus, with the memory(s) 122 (including the applications(s), component(s), API(s), data, etc. stored therein) and/or database 126 to implement or perform the machine readable instructions, methods, processes, elements or limitations, as illustrated, depicted, or described for the various flowcharts, illustrations, diagrams, figures, and/or other disclosure herein.

The processor 120 may include one or more suitable processors (e.g., central processing units (CPUs) and/or graphics processing units (GPUs)). The processor 120 may be connected to the memory 122 via a computer bus (not depicted) responsible for transmitting electronic data, data packets, or otherwise electronic signals to and from the processor 120 and memory 122 in order to implement or perform the machine readable instructions, methods, processes, elements or limitations, as illustrated, depicted, or described for the various flowcharts, illustrations, diagrams, figures, and/or other disclosure herein. The processor 120 may interface with the memory 122 via a computer bus to execute an operating system (OS) and/or computing instructions contained therein, and/or to access other services/aspects. For example, the processor 120 may interface with the memory 122 via the computer bus to create, read, update, delete, or otherwise access or interact with the data stored in memory 122 and/or the database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, micro SD cards, and others. The memory 122 may store an operating system (OS) (e.g., Microsoft Windows, Linux, UNIX, etc.) capable of facilitating the functionalities, apps, methods, or other software as discussed herein.

The memory 122 may store a plurality of computing modules 140, implemented as respective sets of computer-executable instructions (e.g., one or more source code libraries, trained ML models such as neural networks, convolutional neural networks, etc.) as described herein.

In general, a computer program or computer based product, application, or code (e.g., the model(s), such as ML models, or other computing instructions described herein) may be stored on a computer usable storage medium, or tangible, non-transitory computer-readable medium (e.g., standard RAM, an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

For example, in some aspects, the computing modules 140 may include a ML model training module 142, comprising a set of computer-executable instructions implementing ML training, configuration, parameterization and/or storage functionality. The ML model training module 142 may initialize, train and/or store one or more ML knowledge engines, as discussed herein. The ML knowledge engines, or "engines" may be stored in the database 126, which is accessible or otherwise communicatively coupled to the servers 104. The modules 140 may store machine readable instructions, including one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an environmental discovery, validation and automatic knowledge generation ML model or system.

The ML training module 142 may train one or more ML models (e.g., an artificial neural network (ANN)). One or more training data sets may be used for model training in the present techniques, as discussed herein. The input data may have a particular shape that may affect the ANN network architecture. The elements of the training data set may comprise tensors scaled to small values (e.g., in the range of (−1.0, 1.0)). In some aspects, a preprocessing layer may be included in training (and operation) which applies principal component analysis (PCA) or another technique to the input data. PCA or another dimensionality reduction technique may be applied during training to reduce dimensionality from a high number to a relatively smaller number. Reducing dimensionality may result in a substantial reduction in computational resources (e.g., memory and CPU cycles) required to train and/or analyze the input data.

In general, training an ANN may include establishing a network architecture, or topology, adding layers including activation functions for each layer (e.g., a "leaky" rectified linear unit (ReLU), softmax, hyperbolic tangent, etc.), loss function, and optimizer. In an aspect, the ANN may use different activation functions at each layer, or as between hidden layers and the output layer. A suitable optimizer may include Adam and Nadam optimizers. In an aspect, a different neural network type may be chosen (e.g., a recurrent neural network, a deep learning neural network, etc.). Training data may be divided into training, validation, and testing data. For example, 20% of the training data set may be held back for later validation and/or testing. In that example, 80% of the training data set may be used for training. In that example, the training data set data may be shuffled before being so divided. Data input to the artificial neural network may be encoded in an N-dimensional tensor, array, matrix, and/or other suitable data structure. In some aspects, training may be performed by successive evaluation (e.g., looping) of the network, using training labeled training samples. The process of training the ANN may cause weights, or parameters, of the ANN to be created. The weights may be initialized to random values. The weights may be adjusted as the network is successively trained, by using one of several gradient descent algorithms, to reduce loss and to cause the values output by the network to converge to expected, or "learned", values. In an aspect, a regression may be used which has no activation function. Therein, input data may be normalized by mean centering, and a mean squared error loss function may be used, in addition to mean absolute error, to determine the appropriate loss as well as to quantify the accuracy of the outputs.

Figure 6A:
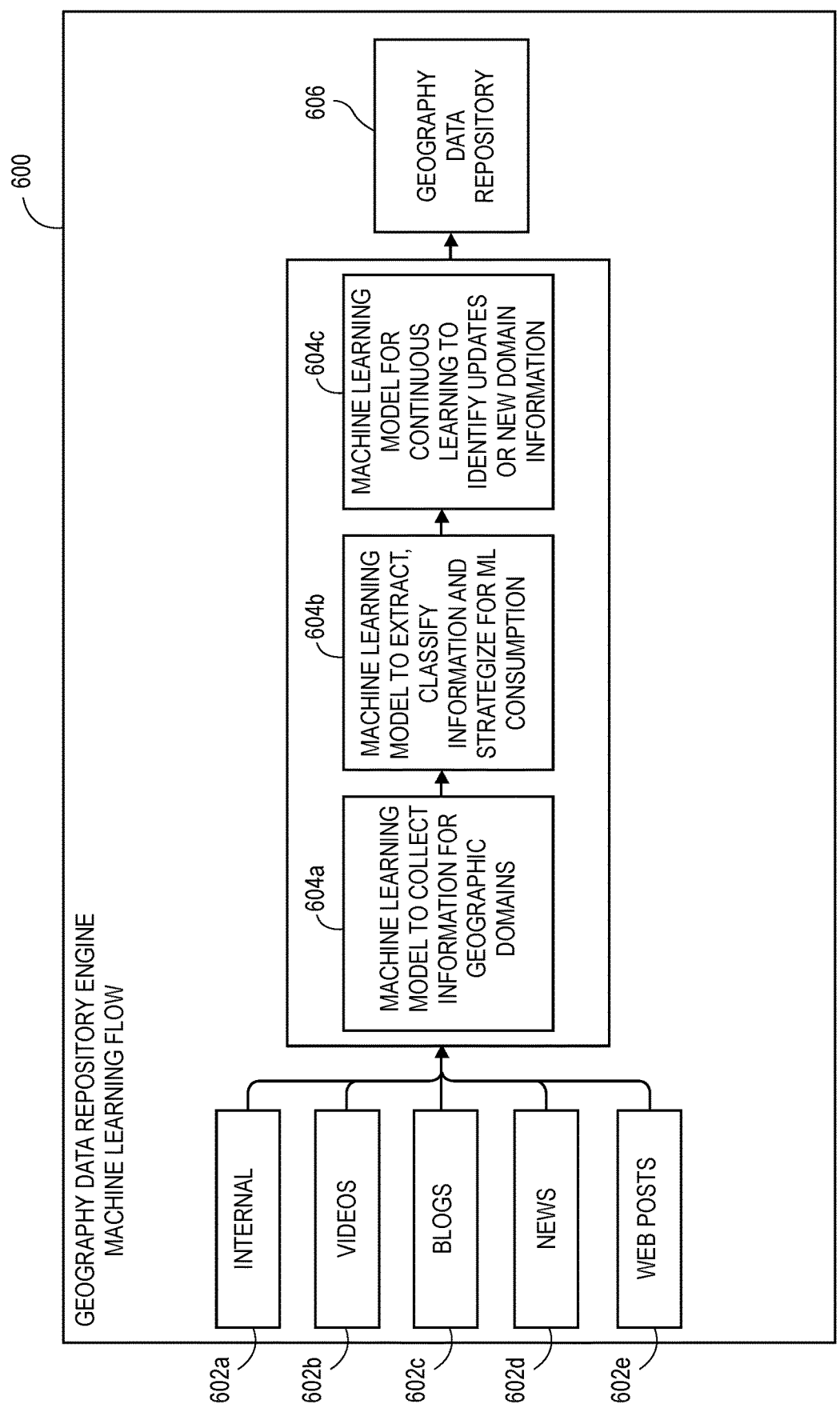
FIG. 6A is an exemplary block flow diagram depicting a computer-implemented method for generating a geography data repository engine using ML, according to an aspect.
Figure 6B:
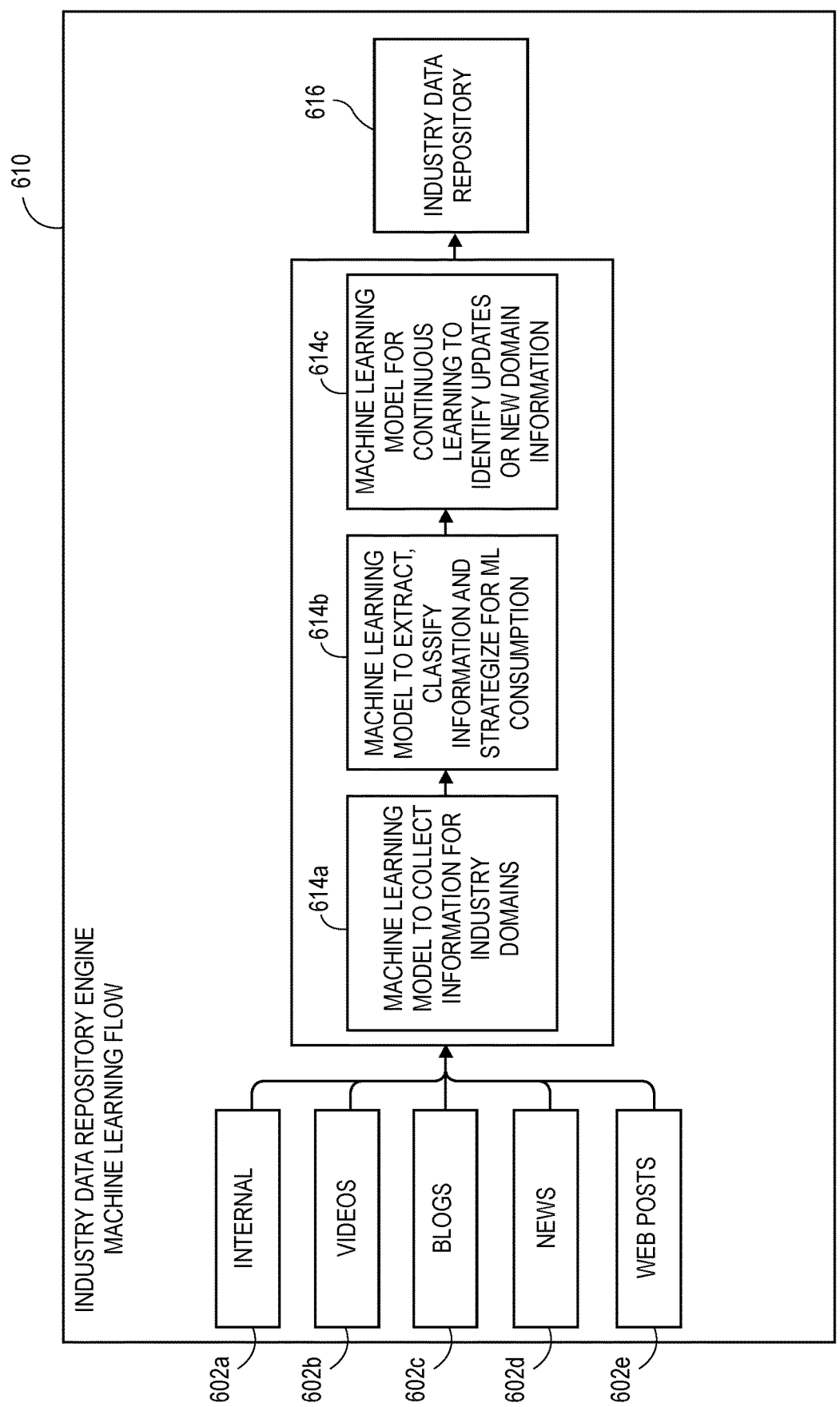
FIG. 6B is an exemplary block flow diagram depicting a computer-implemented method for generating an industry data repository engine using ML, according to an aspect.
Figure 6C:
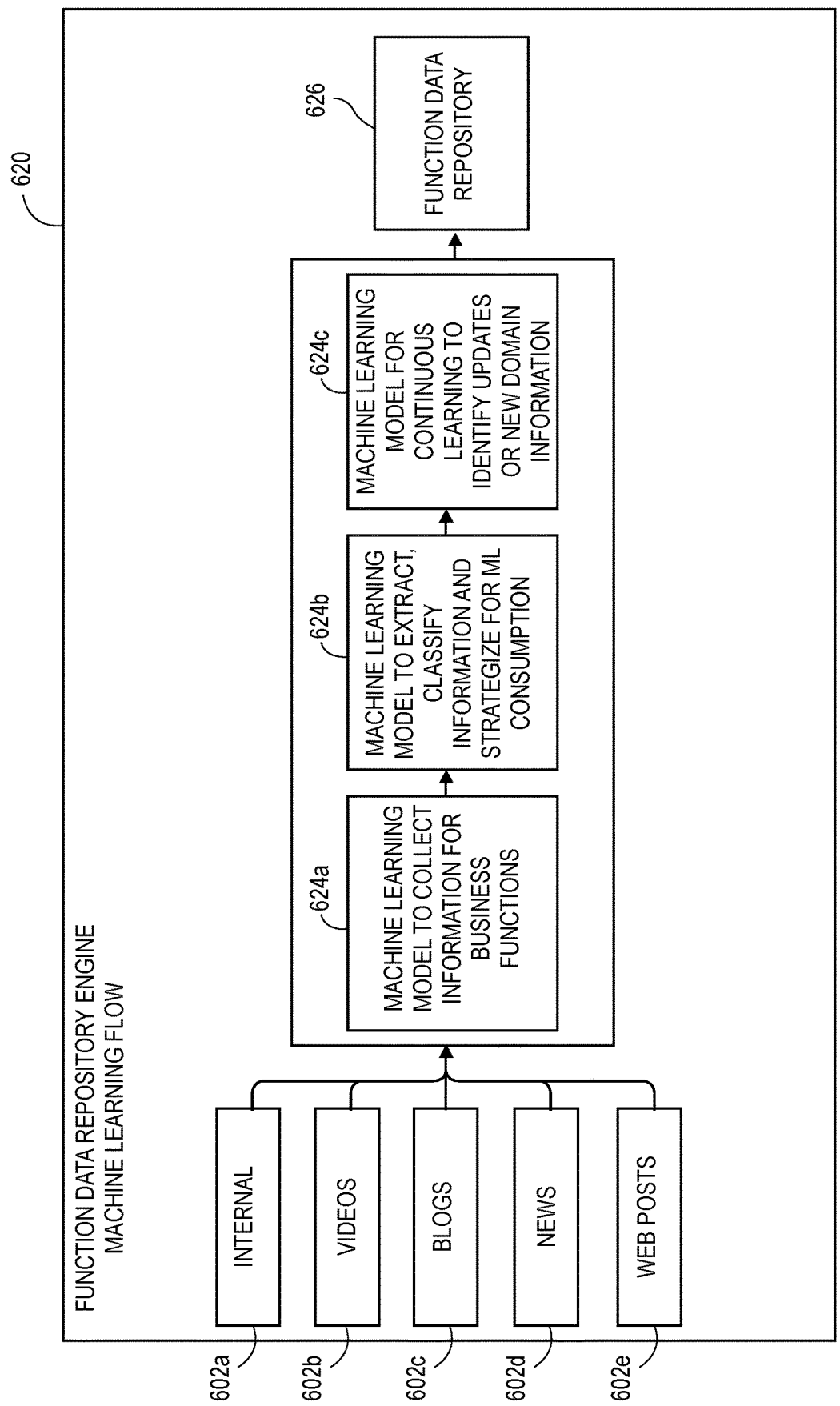
FIG. 6C is an exemplary block flow diagram depicting a computer-implemented method for generating a business function data repository engine using ML, according to an aspect.

The ML training module 142 may receive labeled data at an input layer of a model having a networked layer architecture (e.g., an artificial neural network, a convolutional neural network, etc.) for training the one or more ML models to generate ML models (e.g., the ML model at blocks 624a-624c of FIG. 6C). The received data may be propagated through one or more connected deep layers of the ML model to establish weights of one or more nodes, or neurons, of the respective layers. Initially, the weights may be initialized to random values, and one or more suitable activation functions may be chosen for the training process, as will be appreciated by those of ordinary skill in the art. The method may include training a respective output layer of the one or more ML models. The output layer may be trained to output a prediction, for example.

The data used to train the ANN may include heterogeneous data (e.g., textual data, image data, audio data, etc.). In some aspects, multiple ANNs may be separately trained and/or operated. In some aspects, the present techniques may include using a ML framework (e.g., TensorFlow, Keras, scikit-learn, etc.) to facilitate the training and/or operation of ML models.

In various aspects, an ML model, as described herein, may be trained using a supervised or unsupervised ML program or algorithm. The ML program or algorithm may employ a neural network, which may be a convolutional neural network, a deep learning neural network, or a combined learning module or program that learns in two or more features or feature datasets (e.g., structured data, unstructured data, etc.) in a particular areas of interest. The ML programs or algorithms may also include natural language processing (NLP), semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other ML algorithms and/or techniques. In some aspects, the AI and/or ML based algorithms may be included as a library or package executed on server(s) 104. For example, libraries may include the TensorFlow based library, the Pytorch library, and/or the scikit-learn Python library.

ML may involve identifying and recognizing patterns in existing data (such as data risk issues, data quality issues, sensitive data, etc.) in order to facilitate making predictions, classifications, and/or identifications for subsequent data (such as using the models to determine or generate a classification or prediction for, or associated with, applying a data governance engine to train a descriptive analytics model).

ML model(s), may be created and trained based upon example data (e.g., "training data") inputs or data (which may be termed "features" and "labels") in order to make valid and reliable predictions for new inputs, such as testing level or production level data or inputs. In supervised ML, a ML program operating on a server, computing device, or otherwise processor(s), may be provided with example inputs (e.g., "features") and their associated, or observed, outputs (e.g., "labels") in order for the ML program or algorithm to determine or discover rules, relationships, patterns, or otherwise ML "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised ML, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised ML may also comprise retraining, relearning, or otherwise updating models with new, or different, information, which may include information received, ingested, generated, or otherwise used over time. The disclosures herein may use one or both of such supervised or unsupervised ML techniques.

In various aspects, training the ML models herein may include generating an ensemble model comprising multiple models or sub-models, comprising models trained by the same and/or different AI algorithms, as described herein, and that are configured to operate together. For example, in some aspects, each model may be trained to identify or predict diagnostic analytics, where each model may output or determine a classification for a computing environment such that a given environment may be identified, assigned, determined, or classified with one or more environment classifications.

In some aspects, the computing modules 140 may include a ML operation module 144, comprising a set of computer-executable instructions implementing ML loading, configuration, initialization and/or operation functionality. The ML operation module 144 may include instructions for storing trained models (e.g., in the electronic database 126, as a pickled binary, etc.). Once trained, the one or more trained ML models may be operated in inference mode, whereupon when provided with de novo input that the model has not previously been provided, the model may output one or more predictions, classifications, etc. as described herein.

The architecture of the ML model training module 142 and the ML operation module 144 as separate modules represent advantageous improvements over the prior art. In conventional computing systems that include multiple ML algorithms, for performing various functions, the models are often added to each individual module or set of instructions independent from other algorithms/modules. This is wasteful of storage resources, resulting in significant code duplication. Further, repeating ML model storage in this way may result in retraining of the same model aspects in multiple places, wasting computational resources. By consolidating ML model training and ML model operation into two respective modules that may be reused by any of the various ML algorithms/modeling suites of the present techniques, waste of storage and computation is avoided. Further, this organization enables training jobs to be organized by a task scheduling module (not depicted), for efficiently allocating computing resources for training and operation, to avoid overloading the underlying system hardware, and to enable training to be performed using distributed computing resources (e.g., via the network 110) and/or using parallel computing strategies.

In some aspects, the computing modules 140 may include an input/output (I/O) module 146, comprising a set of computer-executable instructions implementing communication functions. The I/O module 146 ma include a communication component configured to communicate (e.g., send and receive) data via one or more external/network port(s) to one or more networks or local terminals, such as computer network 110 and/or the client 102 (for rendering or visualizing) described herein. In some aspects, servers 104 may include a client-server platform technology such as ASP.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen (e.g., via the terminal 109). I/O module 146 may facilitate I/O components (e.g., ports, capacitive or resistive touch sensitive input panels, keys, buttons, lights, LEDs), which may be directly accessible via, or attached to, servers 104 or may be indirectly accessible via or attached to the client device 102. According to some aspects, an administrator or operator may access the servers 104 via the client device 102 to review information, make changes, input training data, initiate training via the ML training module 142, and/or perform other functions (e.g., operation of one or more trained models via the ML operation module 144).

In some aspects, the computing modules 140 may include a natural language processing (NLP) module 148, comprising a set of computer-executable instructions implementing natural language processing functionality.

In some aspects, the computing modules 140 may include a validation module 150, comprising a set of computer-executable instructions implementing cataloging and making recommendations regarding business regulations, governance standards, rules and policies based on domain-specific knowledge functionality. The validation module 150 may include a set of computer-implemented functionality (e.g., one or more scripts) that determine the acceleration and readiness of an existing computing system and/or domain state (e.g., the current computing environment 106).

For example, the validation module 150 may analyze the memory footprint of an operating system executing in the current computing environment 106, such as the services executing therein. For example, the validation module 150 may collect the amount of memory consumed, version of software, etc. The validation module 150 may include a set of instructions for training one or more ML models to evaluate input (e.g., an electronic template form describing a future computing environment and/or domain state) for validity, by analyzing one or more historical labeled inputs (e.g., a plurality of electronic template forms labeled as valid/invalid). The validation module 150 may access codified knowledge for training the one or more ML models. For example, the proprietor of the present techniques may prepare a codified data set that includes gaps in a domain state (e.g., no specification of an industry domain). The validation module 150 may be provided with the codified data set, wherein the examples are labeled according to whether a component is lacking. The validation module 150 may thereby train the one or more ML models to identify electronic template forms that include gaps in a domain state. Based on the output of the validation module 150, the validation module 150 may generate one or more questions for the customer (e.g., is this the connection you are looking for?). A yes/no answer may be collected from the customer (e.g., via the I/O module 146) in a guided questionnaire aspect, as discussed herein.

In some aspects, the computing modules 140 may include a template module 152, comprising a set of computer-executable instructions implementing templating functionality. The template module 152 may generate one or more electronic template forms, which are electronic objects including a plurality of fields describing a domain state (e.g., of the current computing environment 106, of the future computing environment 108, etc.). The electronic template forms may be used to describe the contents of an existing domain state, for example, and to describe a non-existent but planned future domain state. The electronic template form may comprise computer-executable code that can be evaluated by a graphical user interface (e.g., a web browser) to provide a user with a quick and intuitive understanding of a domain state. For example, one or more domains of a domain state may be displayed using a nested hierarchical view (e.g., a tree view), using a flat list, using an interactive object-based view, etc.

In some aspects, the computing modules 140 may include a knowledge generation module 154, comprising a set of computer-executable instructions implementing knowledge generation functionality. The knowledge generation module may include instructions for accessing and analyzing data from various internal and/or external sources (e.g., internal databases, proprietary databases, a video repository, a blog, a news repository, a webpage, a government database, a business database, etc.) and training one or more ML models based on the accessed data to generate one or more knowledge engines that may be one or more composite ML models, in some aspects. The data obtained from the various sources may be structured data, unstructured data, semi-structured data, streaming data, etc.

Exemplary High-Level System Flow

Figure 2:
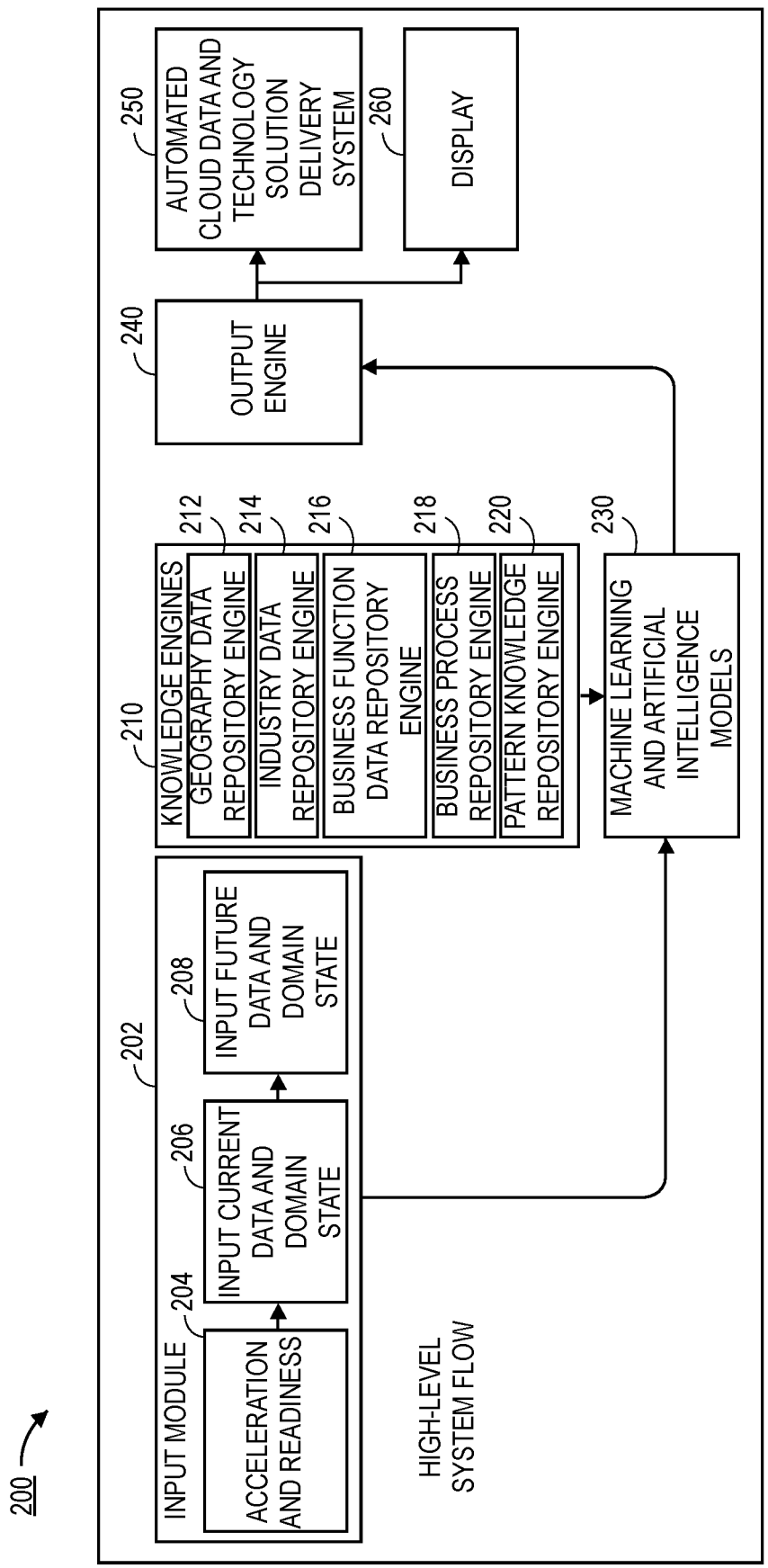
FIG. 2 is an exemplary block flow diagram depicting a computer-implemented method for performing cataloging and making recommendations based on domain-specific knowledge, according to some aspects.

FIG. 2 is an exemplary block flow diagram depicting a computer-implemented method 200 performing cataloging and making recommendations regarding business regulations, governance standards, rules and policies based on domain-specific knowledge, according to some aspects. In block 202, acceleration and readiness system 204 loads pre-built templates, and/or scans an existing architecture/ infrastructure (e.g., the current computing environment 106 of FIG. 1) to collect information to provide full view into a current domain state of a customer's current computing environment. For example, the acceleration and readiness system 204 is implemented by the validation module 150 of the modules 140. The acceleration and readiness module 204 may extract and store current domain state information.

The method 200 contributes to intelligent decision making recommendations regarding business regulations, governance standards, rules and policies based on domain-specific knowledge. In general, the present techniques may be used to determine the current domain state of a computing environment (e.g., the computing environment 106) and to determine one or more future domain states of a computing environment (e.g., the future computing environment 108). The present techniques improve migration technology by making domain state discovery simple and nimble. For example, the acceleration and readiness system 204 may include pre-built electronic templates, and instructions for scanning existing architecture/infrastructure to collect information to provide a full view into a current domain state. For example, the acceleration and readiness module 204 may include instructions for processing architecture and infrastructure diagrams to extract domain state information. The acceleration and readiness system may identify whether information is completed by reference to codified knowledge, organizes data based on source, and uses ML to ensure that information in electronic template forms is completed and any gaps in the domain state identified, and in some aspects, recommending and receiving confirmation of changes from the customer.

The acceleration and readiness system 204 is described in further detail, below, with respect to FIG. 3.

Block 202 may include a current data and domain state system 206 in some aspects. In some cases, customers may be unwilling and/or unable to share all current domain state information. In that case, the current data and domain state system 206 may receive, from the customer, a manually-completed template electronic form (e.g., completed by a subject matter expert) describing the current domain state of the current computing environment 106. The system 206 may analyze the received template to ensure that the template reflects a comprehensive domain state. The system 206 is described in further detail below, with respect to FIG. 4.

Block 202 may include a future data and domain state system 208. System 208 may receive customers/client feedback regarding a future domain state of the customer's computing environment (e.g., the future computing environment 108). In some cases, the customer may provide feedback regarding desired aspects of the future domain state. In some aspects, the customer may state a default preference (e.g., we don't care, give us the best mix of domains). The system 208 may receive customer preferences as to the future domain state, including whether particular domains are required and/or optional.

The method 200 may further include generating knowledge engines at block 210. For example, the knowledge engines may include a geography data repository engine 212, an industry data repository engine 214, a business function data repository engine 216, a business process repository engine 218, and a pattern knowledge repository engine 224. Generation and use of each of the engines at block 210 is described in further detail, below, with respect to FIGS. 6A-6E. More or fewer knowledge engines may be included in some aspects. The block 210 may be considered a collector and generator of knowledge repository engines (i.e., domain building blocks). The knowledge engines at block 210 may be thought of as a central warehouse of domain knowledge building blocks that represent a clear inventory of domain knowledge information and references to the source(s) of such information. The domain knowledge building blocks may be continuously improved and updated from various types of internal data (e.g., proprietary knowledge, experiences from past customer engagements, engineering knowledge, analyst knowledge, etc.) as well as external data sources (e.g., a repository, a blog, a news repository, a webpage, a government database, a business database, etc.). The data obtained from the various sources may be structured data, unstructured data, semi-structured data, streaming data, etc. Additionally, the knowledge engines at block 210 leverage built-in knowledge powered from multiple data sources with near real-time data pipelines to build the warehouse of reusable domain building blocks. The knowledge data pipelines are beneficial for keeping domain knowledge up to date and aligned with the latest business rules, policies, standards and regulations.

At block 210, the method 200 uses ML to categorize and classify data based on geographic, industry, business function, and business process domains and/or patterns thereof. The method 200 may capture disparate types of data (e.g., structure, semi-structured, etc.) from various internal and/or external data sources, and codify the data. The codification process may translate any data to ML data (e.g., tensors) to use the data as inputs for predictions (e.g., for best future domain states). It will be appreciated by those of ordinary skill in the art that the method 200 performs complex analyses that conventionally require significant numbers of high skilled employees (e.g., analysts).

Generally, generating the knowledge engines includes collecting and codifying domain knowledge using ML, and using that knowledge as input for training further one or more ML models. The respective outputs of the knowledge engines at block 210 may be provided to block 230. The training and operation of the knowledge engines at block 210 may be performed by the knowledge generation module 154 of FIG. 1, using, for example, the ML model training module 142 and/or the ML operation module 144 of FIG. 1. At block 210, the knowledge modules may be periodically recomputed.

The method 200 may proceed, at block 230, to analyze the domain knowledge collected and cataloged at block 202 and/or block 210, using one or more ML and/or AI models, as further described with respect to FIGS. 8A-8E, below. The ML model operation and training at block 230 may be performed by, for example, one or more modules 140 of FIG. 1 using, for example, the ML model training module 142 and/or the ML operation module 144 of FIG. 1.

Generally, block 230 leverages the reusable data and domain knowledge building blocks and knowledge engine components to recommend the best blend of domain knowledge building blocks to stitch together for a future domain state and/or a proficient on premise, cloud, or hybrid delivery and transformation based on the future domain state. That is, block 230 identifies a set of one or more business regulations, governance standards, rules and/or policies to be complied with for a current and/or future domain state. In some aspects, the set may include optional, but possibly recommended, business regulations, governance standards, rules and/or policies for a domain state. The method 200 may use block 230 to periodically assess the use of various patterns of domains, and recommend alternate options. The method 200 may continuously help promote innovation by pinpointing changes in business rules, policies, standards and regulations. The method 200 may collect user feedback and systematically incorporate it in future decisions and recommendations correcting any bias that may had been introduced in the system, and detect inefficiencies, triggering opportunities for developing new reusable domain knowledge building blocks.

The output of the one or more ML and/or AI models at block 230 may be received at the output engine 240. Generally, the output engine 240 causes a summary of the set of one or more business regulations, governance standards, rules and policies to be complied with for a domain state to be presented. In some aspects, the output engine 240 may generate a recommendation as a detailed recommendation template including detailed step by step documentation and/or instructions to deploy a set of one or more business regulations, governance standards, rules and policies to be complied with for a domain state. In some aspects, the recommendation is implemented manually. In some examples the instructions may be carried out automatically by a computing system.

In some aspects, the method 200 may include processing the recommendation template generated by the output engine 240 using an automated cloud data and technology solution delivery system at block 250. The system at block 250 may, inter alia, use ML techniques for environmental discovery, environmental validation, and automated knowledge engine generation, and more particularly, for training and operating one or more ML models to analyze current and future architecture state information and generate infrastructure-as-code ready-to-deploy pipelines which can automatically deploy the components based on a preferred target (e.g., on-premise or cloud platform). For example, block 250 may analyze, using one or more ML models, first data representing the set of one or more business regulations, governance standards, rules and policies to be complied with for domain state determined at block 230 and second data representing a current data and architecture state corresponding to a current computing environment to generate a summary of one or more cloud deployment options for migrating the current computing environment to another computing environment for the domain state based on the set of one or more business regulations, governance standards, rules and/or policies to be complied with for the domain state; and cause the summary of the one or more cloud deployment options to be displayed on a computing device, such as the client device 102. In some aspects, the system at block 250 also analyzes, using the one or more ML models, third data representing a future data and architecture state corresponding to a future computing environment to generate the summary of one or more cloud deployment options for migrating the current computing environment to the future computing environment for the domain state.

Example systems that may be used to implement the system at block 250 are described in U.S. patent application Ser. No. 17/506,521, entitled "Machine Learning Techniques for Environmental Discovery, Environmental Validation, and Automated Knowledge Repository Generation," and filed Oct. 20, 2021; and U.S. patent application Ser. No. 17/506,536, entitled "Automated Cloud Data and Technology Solution Delivery Using Machine Learning and Artificial Intelligence Modeling," and filed Oct. 20, 2021. U.S. patent application Ser. No. 17/506,521 and U.S. patent application Ser. No. 17/506,536 are hereby incorporated herein by reference in their entirety.

Exemplary Computer-Implemented Method for Template Generation Machine Learning

Figure 3:
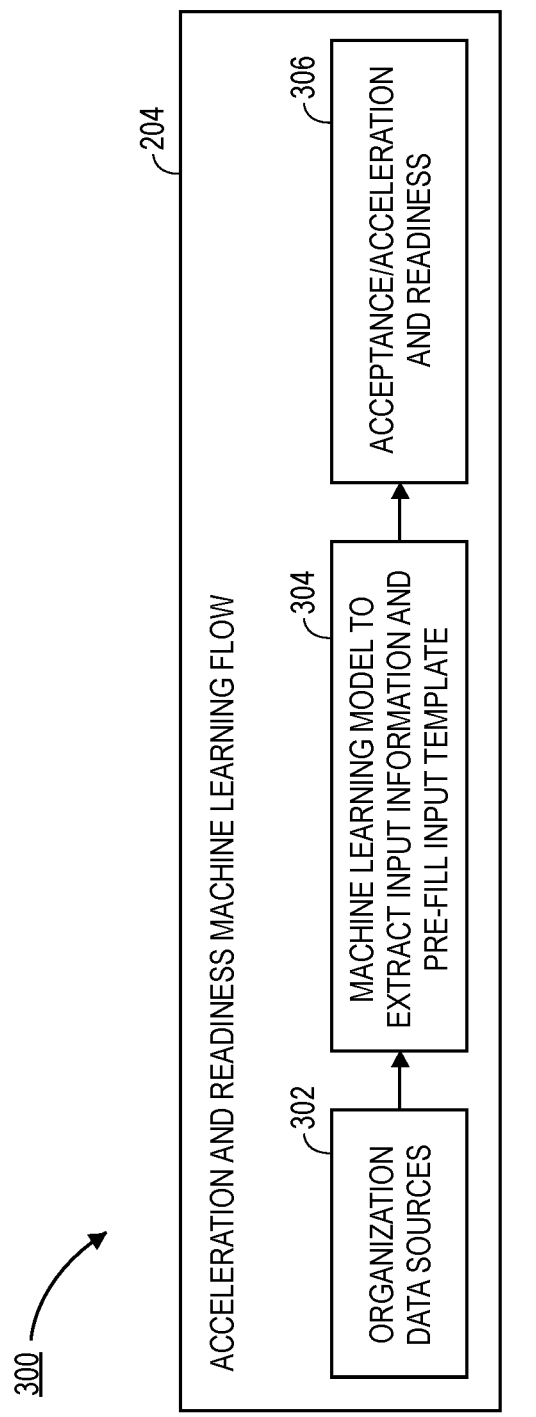
FIG. 3 is an exemplary block flow diagram depicting a computer-implemented method for performing ML training and operation, according to an aspect.

FIG. 3 is an exemplary block flow diagram depicting a computer-implemented method 300 for performing ML training and operation, according to an aspect. The method 300 may be implemented in code, for example, as a subroutine performed by block 204 of FIG. 2. The method 300 includes, at block 304, training a ML model to extract input information received from data sources 302. The input information may be retrieved from the database 126, for example. The training of method 300, at block 302 and at block 304, may be performed by the template module 152, for example, accessing the ML training module 142. The template module 152 may train one or more ML models to generate a pre-filled input template. The training data may include historical data describing historical domain states that are not necessarily those of a particular customer. The trained ML model may be configured by the method 300 to output a pre-filled template that may be analyzed at acceleration and readiness block 306. The acceleration and readiness block 306 may correspond to the block 204 of FIG. 2, in some aspects.

The method 300 may include discovering one or more organization data sources. For example, the method 300 may include the validation module 150 scanning one or more services of the current computing environment 106 to determine one of more domains applicable to the customer as described herein. Further, the method 300 may leverage organization data sources to pre-fill input data and domain electronic template forms, as discussed herein. The ML model at block 304 may perform a proactive evaluation of a current data and domain landscape to extract information and fill in (i.e., parameterize) the input template.

Exemplary Computer-Implemented Method for Data & Domain State Flow

Figure 4:
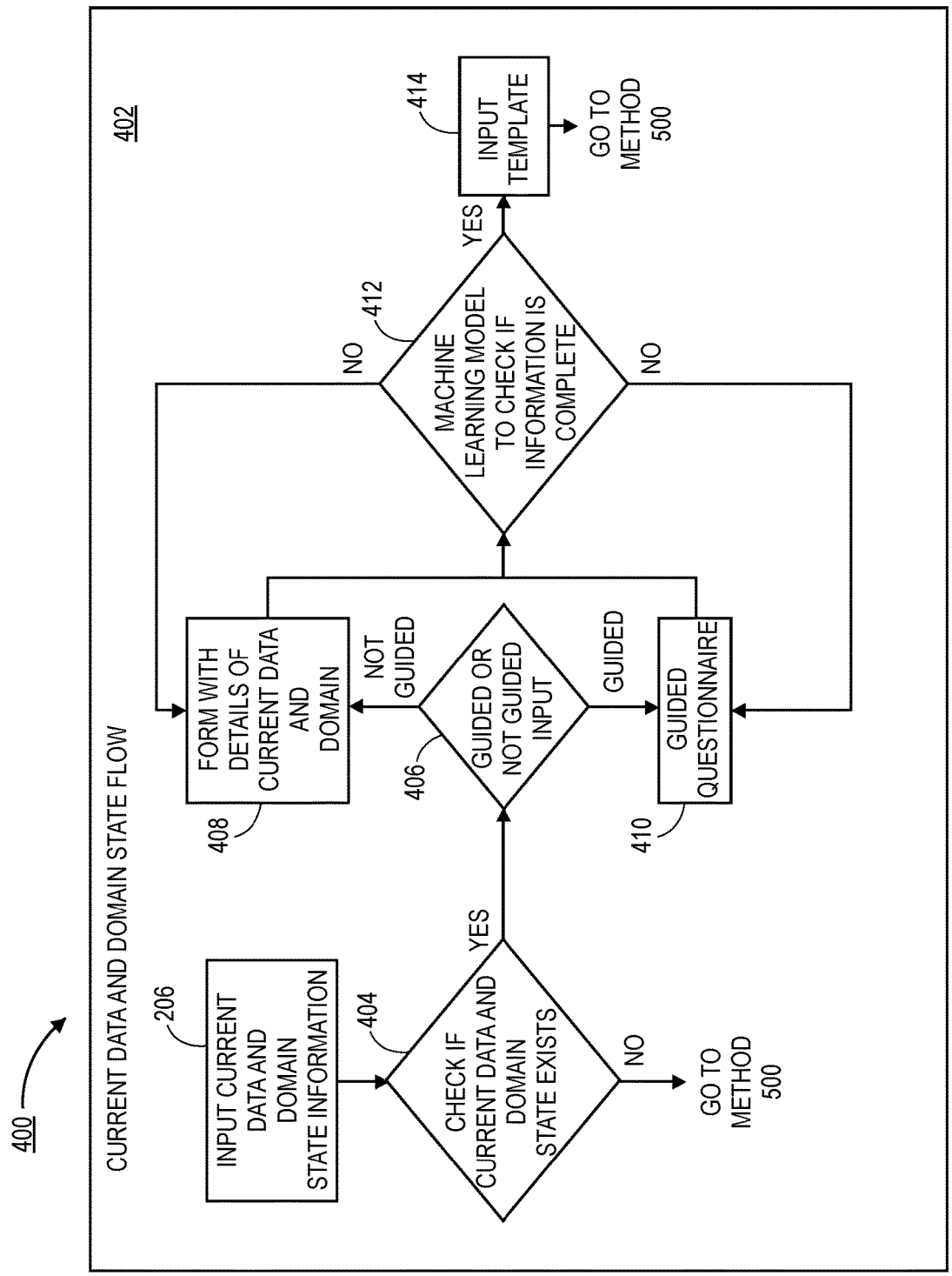
FIG. 4 is an exemplary block flow diagram depicting a computer-implemented method for collecting current domain state information, validating current information, and generating input templates, according to an aspect.

FIG. 4 is an exemplary block flow diagram depicting a computer-implemented method 400 for collecting current data and domain state information, validating current data and domain state information, and generating domain state input templates, according to an aspect. As described in FIG. 2, block 206 of the method 400 includes receiving current data and domain state information. Example data and domain state information includes, for example, a geographic region (e.g., a state, a city, a country, etc.) in which the customer operates and/or is located, an industry (e.g., financial, manufacturing, etc.), a business function (e.g., manufacturing, warehouse, shipping hub, engineering, marketing, sales, legal, etc.), a business process, etc. The current data and domain state may be provided by a customer, or discovered as discussed. At block 404, the method 400 may include determining whether a current data and domain state exists. For example, the template module 152 may query the database 126, using a customer identifier and/or an identifier associated with the current computing environment 106, to determine whether a current data and domain state exists.

At block 406, the method 400 may branch depending on whether the customer has selected (e.g., by the customer accessing the I/O module 146 via the client device 102) an unguided configuration procedure (block 408) or a guided configuration procedure (block 410).

At block 406, the method 400 may select the output of the ML model at block 304 (i.e., a template encoded as an electronic form). The method 400 may pass the output to a validation ML model at block 412. The validation ML model may have been trained, at an earlier time, by the validation module 150 of the one or more servers 104 to analyze the template electronic form to determine whether the template describes a valid current data and domain state, as discussed.

In an unattended/unguided view, as at block 408, the block 412 may generate an input template electronic form 414 without interactive user feedback (i.e., as an entirely unattended computing process). In that case, a user choice ML model (e.g., trained by the template module 152) may answer questions that would be answered by the user in an attended or guided process, such as the one at block 410. The user choice ML may be trained using previous user answers to predict the most likely user responses to questions. For example, the template module 152 may access prior questions and answers related to missing domains and, based on those answers, train the user choice ML model.

At block 410, for example, the I/O module 146 may transmit one or more configuration inquiries to the user via the network 110. For example, the customer may be using the client device 102 to receive the transmitted inquiries. The memory of the client device 102 may include a set of computer-executable instructions that receive the inquiries and display them in a graphical user interface, for example. The set of instructions in the client device 102 may collect the user's responses via an input device (e.g., a touchpad) and transmit the responses to each respective inquiry to the I/O module 146 via the network 110.

At block 412, the method 400 may include analyzing the customer's preferences with respect to data and domain state to select one or more suitable pre-trained ML models for analyzing the data and domain state template electronic form generated by the guided/unguided procedure, to determine the current data and domain state. The method 400 may operate the one or more selected ML models, providing the template electronic form as input, to generate a current domain state input template at block 414. The template electronic form may be repeatedly evaluated and modified, by control flowing back to block 408 or block 410 while the current data and domain state template 414 remains incomplete.

It should be appreciated that blocks 406 and 408 provide a high level of granularity and customizability, at the cost of requiring the customer to make choices about the current domain state. In some aspects, the blocks 406 and 408 may be omitted, wherein default preferences are substituted.

It should also be appreciated that once the input is generated, no current domain state may exist, because the customer does not have a current deployment. In that case, the method 400 may consider only future domain state, and not current state.

Figure 5:
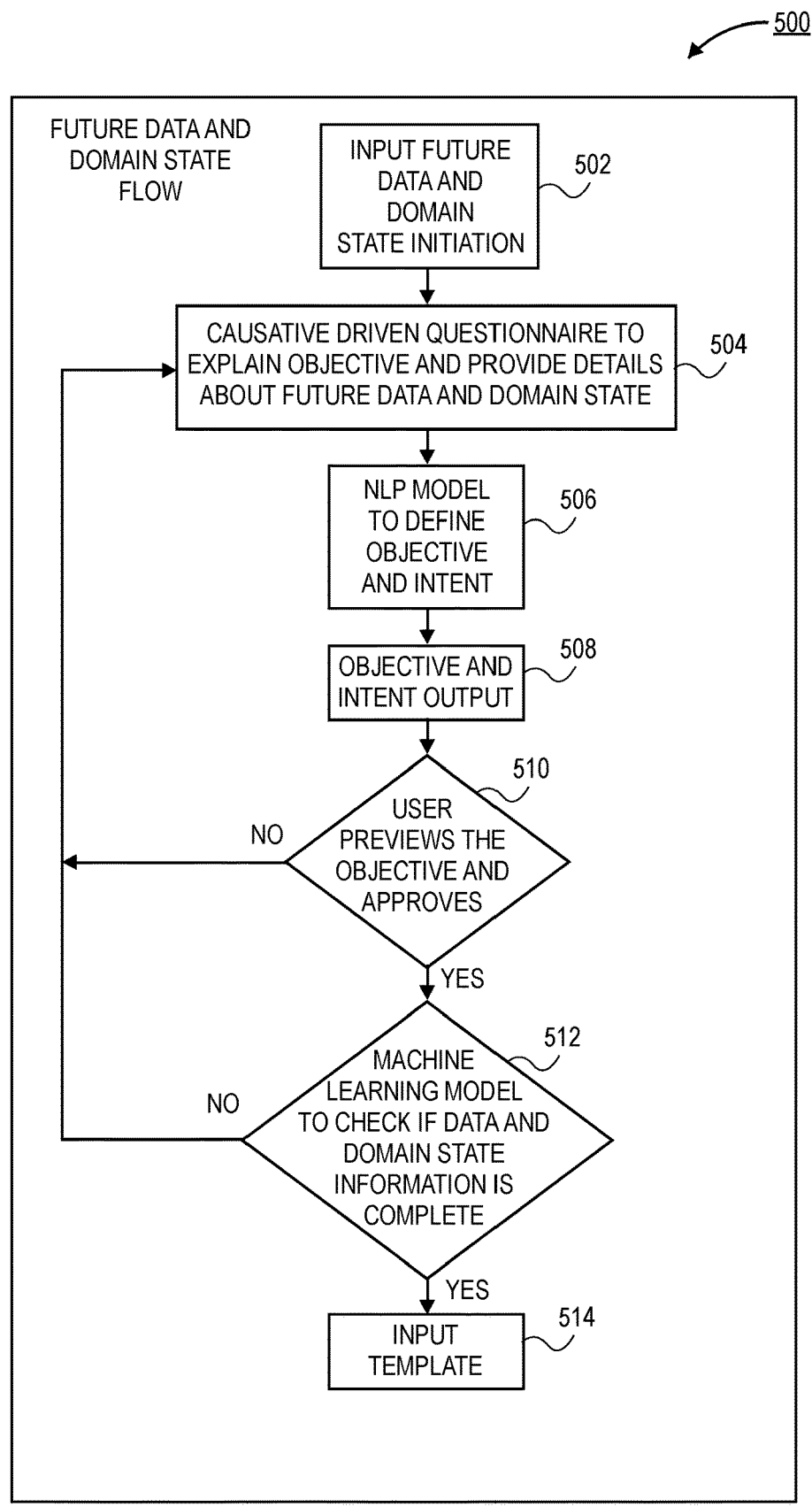
FIG. 5 is an exemplary block flow diagram depicting a computer-implemented method for analyzing future data and domain state, collecting future state information, determining objectives and/or intents, generating/displaying previews, validating future state information and generating input templates, according to an aspect.

Furthermore, in some aspects, the determination of domain state may be deferred and requested by the method 400 at a later stage (e.g., during an guided questionnaire at block 410), or determined using yet another pre-trained ML model, or requested as part of a flow involving NLP, as depicted in FIG. 5.

Exemplary Computer-Implemented Natural Language Processing Methods

In general, NLP may be used in the present techniques to determine, and act upon, the meanings contained in human speech/utterances/writings/etc. For example, in some aspects, NLP may be used to provide pre-filled templates. An aspect of the present techniques may, for example, prompt a user (e.g., the customer) to describe a future domain state. The present techniques may also include instructions for identifying noncommittal speech (e.g., "we don't care," "just give us the best," etc.). The present techniques may collect and codify user speech and use it as training data for one or more ML models, to predict what kind of domain state (i.e., which domains are applicable) is the best considering past experience and knowledge of domain states.

The NLP-based methods improve on conventional techniques, by enabling the present techniques to determine a future domain state of the customer's deployment by using ML to analyze input as data and knowledge from engineering work and/or expert knowledge. The present techniques, as in the method 200, convert knowledge artifacts into codified numbers that may be ingested by one or more ML models, enabling the ML models to determine whether there is a complete view of the customer's future domain state, and if not, to confirm missing gaps. The present techniques provide readiness and acceleration via templates and ML current state and future state, to determine that the customer's future domain state is complete. If the future data and domain state is not complete, the ML model may identify gaps and provide recommendations that may be contingent on the client's confirmation.

FIG. 5 is an exemplary block flow diagram depicting a computer-implemented method 500 for analyzing a future data and domain state, collecting future domain state information, determining objectives and/or intents, generating/displaying previews, validating future domain state information and generating input templates, according to an aspect.

A template electronic form may be received at block 502, and processed at block 504 using a causative-driven questionnaire to determine the customer's objectives, and provide details regarding the customer's desired future data and domain state, including whether the customer has preferences regarding domain options. Whereas method 400 may require the customer to make an explicit selection from a pre-determined list of domains, the method 500 may include one or more pre-trained NLP models that are capable of determining a customer objective and/or intent. For example, at block 506, user responses provided in the causative questionnaire at block 504 may be processed by the NLP module 148. For example, the method 500 may receive natural language utterances/speech/writings/etc., such as "give me a robust domain state that scales well." The NLP model 148 may evaluate the customer's utterance to identify domain state objectives. Based on these objective indicia, the method 500 may generate an objective and intent output at 508. Further, the method 500 may display the objectives to the customer, along with an indication of confidence in each objective.

Generally, the questionnaire will embed causative decision making solutions which will help in decision making if the customer has a lack of understanding of the future domain state. Causative decision making may leverage principles of rational choice to create a more accurate and appropriate solution. The user's answers to the questionnaire may be fed into the NLP model 148 that outputs detailed future data and domain state details with granular intent and specifics of the request in a visual format.

At block 510, the customer has the ability to preview the detailed machine generated objectives and has the ability to either approve them or go back to explaining the objective via the detailed questionnaire at block 504. Once a detailed objective of the future data and domain state are approved by the customer at block 510, at block 512 a validation ML validates the future data and domain state for accuracy and completeness. If the future data and domain state is accurate and complete at block 512, a detailed future data and domain state input template is generated at block 514. If the ML model validation check fails at block 512, the customer may be directed back to the detailed questionnaire at block 504 to re-explain their objective in the context of the failure error(s). Additionally and/or alternatively, if the data and domain state is not complete at block 512, the ML model may identify gaps and provide recommendations contingent on the customer's confirmation.

Continuing the example, the NLP module 148 may, via the I/O module 146, transmit a message (e.g., an HTTP POST message) to the client computing device 102 comprising a JavaScript Object Notation (JSON) payload including each identified objective and score. The client device 102 may parse and display the JSON to the user via a web page or other graphical user interface (not depicted). The client device 102 may collect a user indication of approval or disapproval via the graphical user interface. In the case that the customer does not approve, the method 500 may revert to block 504 and request further input from the customer. In the case that the customer approves, the method 500 may process the customer objectives using a pre-trained ML model. For example, the pre-trained ML model may correspond to the ML model at block 412 of FIG. 4.

Exemplary Machine Learning Based Knowledge Engines

As discussed above, the present techniques may include initializing, training and/or storing one or more ML domain knowledge repository engines. The ML domain knowledge repository engines may be used, in some aspects, to codify, or curate, information accessible to the proprietor of the present techniques into machine data that can be processed, analyzed, etc. by a ML model. It will be appreciated by those of ordinary skill in the art that a mature consultancy and/or other business may possess large amounts of valuable data in different broad-based categories. Such institutional knowledge, as well as externally available knowledge, is advantageously encoded via the present techniques, and made available to downstream ML processes and systems, thereby improving ML training systems and techniques.

FIG. 6A is an exemplary block flow diagram depicting a computer-implemented method 600 for generating one or more geography data repository engines using ML, according to an aspect. The method 600 classifies business rules, governance standards, regulations and/or policies by geography to generate a geography data repository 606 that may be used to identify business rules, governance standards, regulations and/or policies and/or best practices thereof by geography.

At blocks 602a-602e, the method 600 may include receiving/retrieving, in parallel and/or serially, data from a plurality of internal and/or external data sources (e.g., internal databases, proprietary databases, a video repository, a blog, a news repository, a webpage, a government database, a business database, etc.). The data obtained from the blocks 602a-602e may be structured data, unstructured data, semi-structured data, streaming data, etc. At blocks 604a-604c, the data may be analyzed to train a plurality of ML models. For example, with reference to FIG. 1, the ML training module 142 may retrieve the data at blocks 602a-602e from the database 126. At block 604a-604c, the data may be processed (e.g., by the ML training module 142) to generate one or more trained models.

Specifically, at block 604a, the ML training module 142 may train an ML model to collect information from the blocks 602a-602e according to geographic domains and according to different types and/or formats. For example, the mime type of the data may be determined. A trained ML model may be used to determine the type of data, e.g., by training the ML model using labeled historical data (e.g., a group of files labeled by type or format). At block 604b, the ML training module 142 may train an ML model to analyze the collected data to extract aspects of and classify the data based upon geographic domains for subsequent ML model consumption. At block 604c, the ML training module 142 may train an ML model to continuously learn geographic domain knowledge based upon updated and/or new data made available from the data sources 602a-602e. At block 604c, the method 600 may also learn to identify efficiencies of past domain states, identify inefficiencies of past domain states, propose alternative domain states, etc.

The ML models trained at blocks 604a-604c may be self-learning and extract geography domain knowledge information from different data sources, data types/formats, etc. The method 600 may continuously ingest data from the various data sources 602a-602e, and feed the data into the various ML models of the blocks 604a-604e. Once the method 600 trains individual models at blocks 604a-604c, the method 600 may combine the individually trained models into a data structure engine at block 606 composed of one or more of the models trained at blocks 604a-604c.

For example, the geography data repository 606 may be a single ML model (e.g., an ANN model) having a plurality of input parameters, wherein each one corresponds to one of the blocks 604a-604c. De novo inputs may be provided to the blocks 604a-604c to generate multiple outputs. In some aspects, the models trained at blocks 604a-604c may be combined as multiple layers of a single ML model (e.g., of an ANN). In that case, data may be passed to a first 1 . . . n layers corresponding to the model of block 604a, then to a second n+1 . . . m layers corresponding to the model of block 604b, and so on. Ultimately, output of the layers may correspond to the output of the geography data repository engine at block 606. The particular combination of the ML models 604a-604c may depend on aspects of the invention in practice. For example, the geography data repository 606 may form the basis of further ML models trained, for example, using ensemble techniques, transfer learning, and deep learning techniques, as will be appreciated by those of ordinary skill in the art. Further, in some aspects, the geography data repository 606 may include more or fewer models than those trained respectively by blocks 604a-604c.

FIG. 6B is an exemplary block flow diagram depicting a computer-implemented method 610 for generating one or more industry data repository engines using ML, according to an aspect. The method 610 classifies business rules, governance standards, regulations and/or policies by industry to generate an industry data repository 614 that may be used to identify business rules, governance standards, regulations and/or policies and/or best practices thereof by industry.

At blocks 602a-602e, the method 610 may include receiving/retrieving, in parallel and/or serially, data from a plurality of internal and/or external data sources (e.g., internal databases, proprietary databases, a video repository, a blog, a news repository, a webpage, a government database, a business database, etc.). The data obtained from the blocks 602a-602e may be structured data, unstructured data, semi-structured data, streaming data, etc. At blocks 614a-614c, the data may be analyzed to train a plurality of ML models. For example, with reference to FIG. 1, the ML training module 142 may retrieve the data at blocks 602a-602e from the database 126. At block 614a-614c, the data may be processed (e.g., by the ML training module 142) to generate one or more trained models.

Specifically, at block 614a, the ML training module 142 may train an ML model to collect information from the blocks 602a-602e according to geographic domains and according to different types and/or formats. At block 614b, the ML training module 142 may training an ML model to analyze the collected data to extract aspects of and classify the data based upon geographic domains for subsequent ML model consumption. At block 614c, the ML training module 142 may train an ML model to continuously learn geographic domain knowledge based on updated and/or new data made available from the data sources 602a-602e. At block 614c, the method 610 may also learn to identify efficiencies of past domain states, identify inefficiencies of past domain states, propose alternative domain states, etc.

The ML models trained at blocks 614a-614c may be self-learning and extract industry domain knowledge information from different data sources, data types/formats, etc. The method 610 may continuously ingest data from the various data sources 602a-602e, and feed the data into the various ML models of the blocks 614a-614e. Once the method 610 trains individual models at blocks 614a-614c, the method 610 may combine the individually trained models into the industry data repository at block 616 composed of one or more of the models trained at blocks 614a-614c.

For example, the industry data repository 616 may be a single ML model (e.g., an ANN model) having a plurality of input parameters, wherein each one corresponds to one of the blocks 614a-614c. De novo inputs may be provided to the blocks 614a-614c to generate multiple outputs. In some aspects, the models trained at blocks 614a-614c may be combined as multiple layers of a single ML model (e.g., of an ANN). In that case, data may be passed to a first 1 . . . n layers corresponding to the model of block 614a, then to a second n+1 . . . m layers corresponding to the model of block 614b, and so on. Ultimately, output of the layers may correspond to the output of the industry data repository engine at block 616. The particular combination of the ML models 614a-614c may depend on aspects of the invention in practice. For example, the industry data repository 616 may form the basis of further ML models trained, for example, using ensemble techniques, transfer learning, and deep learning techniques, as will be appreciated by those of ordinary skill in the art. Further, in some aspects, the industry data repository 616 may include more or fewer models than those trained respectively by blocks 614a-614c.

FIG. 6C is an exemplary block flow diagram depicting a computer-implemented method 620 for generating one or more business function data repository engines using ML, according to an aspect. The method 620 classifies business rules, governance standards, regulations and/or policies by business function to generate a business function data repository 626 that may be used to identify business rules, governance standards, regulations and/or policies and/or best practices thereof by business function.

At blocks 602a-602e, the method 620 may include receiving/retrieving, in parallel and/or serially, data from a plurality of internal and/or external data sources (e.g., internal databases, proprietary databases, a video repository, a blog, a news repository, a webpage, a government database, a business database b, etc.). The data obtained from the blocks 602a-602e may be structured data, unstructured data, semi-structured data, streaming data, etc. At blocks 624a-624c, the data may be analyzed to train a plurality of ML models. For example, with reference to FIG. 1, the ML training module 142 may retrieve the data at blocks 602a-602e from the database 126. At block 624a-624c, the data may be processed (e.g., by the ML training module 142) to generate one or more trained models.

Specifically, at block 624a, the ML training module 142 may train an ML model to collect information from the blocks 602a-602e according to geographic domains and according to different types and/or formats. At block 624b, the ML training module 142 may training an ML model to analyze the collected data to extract aspects of and classify the data based upon geographic domains for subsequent ML model consumption. At block 624c, the ML training module 142 may train an ML model to continuously learn geographic domain knowledge based on updated and/or new data made available from the data sources 602a-602e. At block 624c, the method 620 may also learn to identify efficiencies of past domain states, identify inefficiencies of past domain states, propose alternative domain states, etc.

The ML models trained at blocks 624a-624c may be self-learning and extract business function domain knowledge information from different data sources, data types/formats, etc. The method 620 may continuously ingest data from the various data sources 602a-602e, and feed the data into the various ML models of the blocks 624a-624e. Once the method 620 trains individual models at blocks 624a-624c, the method 620 may combine the individually trained models into business function data repository at block 626 composed of one or more of the models trained at blocks 624a-624c.

For example, the business function data repository 626 may be a single ML model (e.g., an ANN model) having a plurality of input parameters, wherein each one corresponds to one of the blocks 624a-624c. De novo inputs may be provided to the blocks 624a-624c to generate multiple outputs. In some aspects, the models trained at blocks 624a-624c may be combined as multiple layers of a single ML model (e.g., of an ANN). In that case, data may be passed to a first 1 . . . n layers corresponding to the model of block 624a, then to a second n+1 . . . m layers corresponding to the model of block 624b, and so on. Ultimately, output of the layers may correspond to the output of the business function data repository engine at block 626. The particular combination of the ML models 624a-624c may depend on aspects of the invention in practice. For example, the business function data repository 626 may form the basis of further ML models trained, for example, using ensemble techniques, transfer learning, and deep learning techniques, as will be appreciated by those of ordinary skill in the art. Further, in some aspects, the business function data repository 626 may include more or fewer models than those trained respectively by blocks 624a-624c.

Figure 6D:
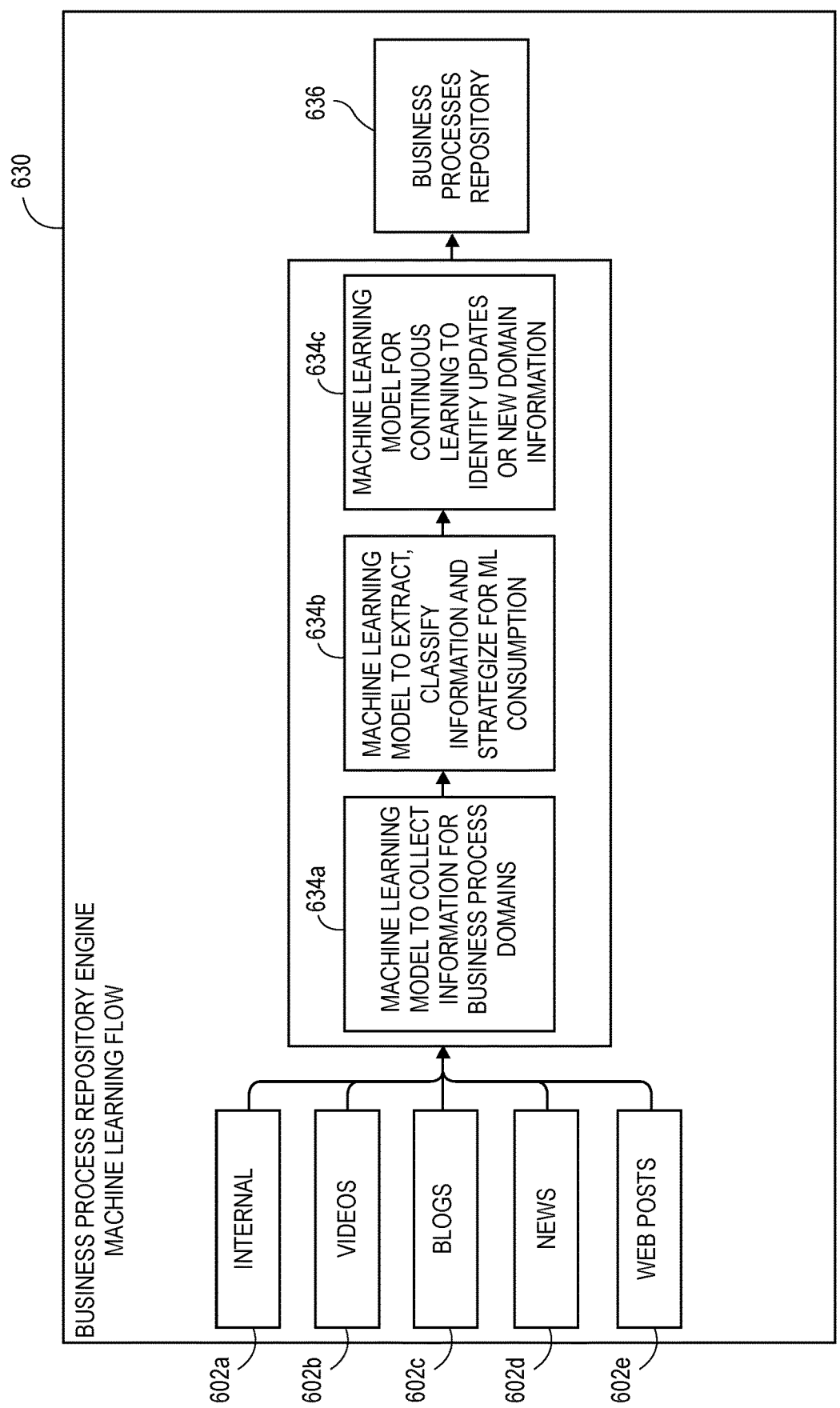
FIG. 6D is an exemplary block flow diagram depicting a computer-implemented method for generating a business process repository engine using ML, according to an aspect.

FIG. 6D is an exemplary block flow diagram depicting a computer-implemented method 630 for generating one or more business process data repository engines using ML, according to an aspect. The method 630 classifies business rules, governance standards, regulations and/or policies by business process to generate a business process data repository 636 that may be used to identify business rules, governance standards, regulations and/or policies and/or best practices thereof by business process.

At blocks 602a-602e, the method 630 may include receiving/retrieving, in parallel and/or serially, data from a plurality of internal and/or external data sources (e.g., internal databases, proprietary databases, a video repository, a blog, a news repository, a webpage, a government database, a business database, etc.). The data obtained from the blocks 602a-602e may be structured data, unstructured data, semi-structured data, streaming data, etc. At blocks 634a-634c, the data may be analyzed to train a plurality of ML models. For example, with reference to FIG. 1, the ML training module 142 may retrieve the data at blocks 602a-602e from the database 126. At block 634a-634c, the data may be processed (e.g., by the ML training module 142) to generate one or more trained models.

Specifically, at block 634a, the ML training module 142 may train an ML model to collect information from the blocks 602a-602e according to geographic domains and according to different types and/or formats. At block 634*b*, the ML training module 142 may training an ML model to analyze the collected data to extract aspects of and classify the data based upon geographic domains for subsequent ML model consumption. At block 634*c*, the ML training module 142 may train an ML model to continuously learn geographic domain knowledge based on updated and/or new data made available from the data sources 602*a*-602*e*. At block 634*c*, the method 630 may also learn to identify efficiencies of past domain states, identify inefficiencies of past domain states, propose alternative domain states, etc.

The ML models trained at blocks 634*a*-634*c* may be self-learning and extract business process domain knowledge information from different data sources, data types/formats, etc. The method 630 may continuously ingest data from the various data sources 602*a*-602*e*, and feed the data into the various ML models of the blocks 634*a*-634*e*. Once the method 630 trains individual models at blocks 634*a*-634*c*, the method 630 may combine the individually trained models into the business process data repository at block 636 composed of one or more of the models trained at blocks 634*a*-634*c*.

For example, the business process data repository 636 may be a single ML model (e.g., an ANN model) having a plurality of input parameters, wherein each one corresponds to one of the blocks 634*a*-634*c*. De novo inputs may be provided to the blocks 634*a*-634*c* to generate multiple outputs. In some aspects, the models trained at blocks 634*a*-634*c* may be combined as multiple layers of a single ML model (e.g., of an ANN). In that case, data may be passed to a first 1 . . . n layers corresponding to the model of block 634*a*, then to a second n+1 . . . m layers corresponding to the model of block 634*b*, and so on. Ultimately, output of the layers may correspond to the output of the business process data repository engine at block 636. The particular combination of the ML models 634*a*-634*c* may depend on aspects of the invention in practice. For example, the business process data repository 636 may form the basis of further ML models trained, for example, using ensemble techniques, transfer learning, and deep learning techniques, as will be appreciated by those of ordinary skill in the art. Further, in some aspects, the business process data repository 636 may include more or fewer models than those trained respectively by blocks 634*a*-634*c*.

Figure 6E:
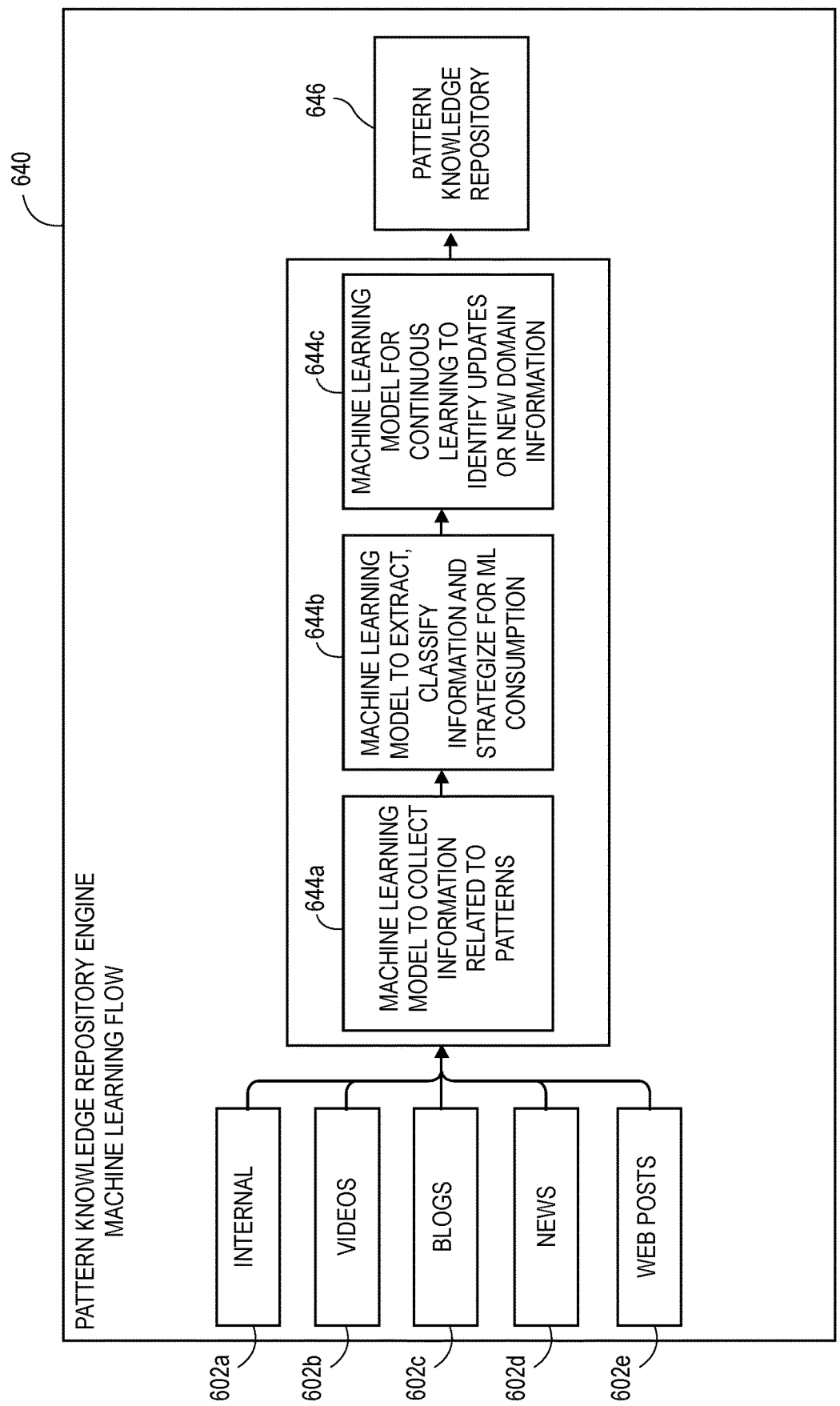
FIG. 6E is an exemplary block flow diagram depicting a computer-implemented method for generating a pattern knowledge repository engine using ML, according to an aspect.

FIG. 6E is an exemplary block flow diagram depicting a computer-implemented method 640 for generating one or more pattern knowledge engines using ML, according to an aspect. The method 640 classifies, ranks, evaluates, etc. patterns related to domain states to generate a pattern knowledge data repository 646 that may be used to identify applicable patterns of business rules, governance standards, regulations and/or policies and/or best practices thereof. That is, the pattern knowledge data repository 646 may be used to understand best practices for integrating the geographic aspects, the industry aspects, the business function aspects and/or the business process aspects of a domain state. In some aspects, the pattern knowledge data repository 646 may learn the successes, failures, inefficiencies, customer feedback, etc. associated with past recommended, identified, implemented, etc. patterns of business rules, governance standards, regulations and/or policies.

At blocks 602*a*-602*e*, the method 640 may include receiving/retrieving, in parallel and/or serially, data from a plurality of internal and/or external data sources (e.g., internal databases, proprietary databases, a video repository, a blog, a news repository, a webpage, a government database, a business database, etc.). The data obtained from the blocks 602*a*-602*e* may be structured data, unstructured data, semi-structured data, streaming data, etc. At blocks 644*a*-644*c*, the data may be analyzed to train a plurality of ML models. For example, with reference to FIG. 1, the ML training module 142 may retrieve the data at blocks 602*a*-602*e* from the database 126. At block 644*a*-644*c*, the data may be processed (e.g., by the ML training module 142) to generate one or more trained models.

Specifically, at block 644*a*, the ML training module 142 may train an ML model to collect information from the blocks 602*a*-602*e* according to patterns of domains and according to different types and/or formats. At block 644*b*, the ML training module 142 may training an ML model to analyze the collected data to extract aspects of and classify the data based upon patterns of domains for subsequent ML model consumption. At block 644*c*, the ML training module 142 may train an ML model to continuously learn domain pattern knowledge based on updated and/or new data made available from the data sources 602*a*-602*e*. At block 644*c*, the method 640 may also learn to identify efficiencies of past domain patterns, identify inefficiencies of past domain patterns, propose alternative domain patterns, etc.

The ML models trained at blocks 644*a*-644*c* may be self-learning and extract domain pattern knowledge information from different data sources, data types/formats, etc. The method 640 may continuously ingest data from the various data sources 602*a*-602*e*, and feed the data into the various ML models of the blocks 644*a*-644*e*. Once the method 640 trains individual models at blocks 644*a*-644*c*, the method 640 may combine the individually trained models into the pattern knowledge engine at block 646 composed of one or more of the models trained at blocks 644*a*-644*c*.

For example, the pattern knowledge repository 646 may be a single ML model (e.g., an ANN model) having a plurality of input parameters, wherein each one corresponds to one of the blocks 644*a*-644*c*. De novo inputs may be provided to the blocks 644*a*-644*c* to generate multiple outputs. In some aspects, the models trained at blocks 644*a*-644*c* may be combined as multiple layers of a single ML model (e.g., of an ANN). In that case, data may be passed to a first 1 . . . n layers corresponding to the model of block 644*a*, then to a second n+1 . . . m layers corresponding to the model of block 644*b*, and so on. Ultimately, output of the layers may correspond to the output of the business process data repository engine at block 646. The particular combination of the ML models 644*a*-644*c* may depend on aspects of the invention in practice. For example, the pattern knowledge repository 646 may form the basis of further ML models trained, for example, using ensemble techniques, transfer learning, and deep learning techniques, as will be appreciated by those of ordinary skill in the art. Further, in some aspects, the pattern knowledge repository 646 may include more or fewer models than those trained respectively by blocks 644*a*-644*c*.

It will be appreciated by those of ordinary skill in the art that the knowledge engines of block 610, once trained and optionally combined, may be used in conjunction with the present techniques, and/or used for other purposes (e.g., in an unrelated application). It is envisioned that the knowledge engines generated by the present techniques may be made available as services to a third party via the servers 104 of FIG. 1, for example using a pay-per-query model. Further, the knowledge engines may include wrapper code that enables them to be parameterized and easily accessed using a user-friendly API, such as a Representational State Transfer (REST) API.

Still further, it will be appreciated by those of ordinary skill in the art that the ML training and/or operation steps of the methods of FIGS. 6A-6E may be performed in serial/sequential order and/or in parallel, in some aspects, depending on, for example, curation and/or sanitization needs, requirements, etc. For example, regarding FIG. 6A, block 604*a* may first train an ML model to collect data as discussed above, and then train another ML model at the block 604*b*. In some embodiments, the output of the trained ML model at block 604*a* may be passed to the block 604*b* as input to the ML model trained at block 604*b*. In some embodiments, an ML model at one or more of blocks 604*a*-604*c* may be used in an inference mode, wherein the output of the blocks 604*a*-604*c* is passed to another ML model to generate additional inferences. The blocks 614*a*-614*c*, 624*a*-624*c*, 634*a*-634*c*, 644*a*-644*c* may be similarly trained. In other aspects, at blocks 604*a*-604*c*, the data may be analyzed to train a plurality of ML models wherein each model is trained independently using the data received at blocks 602*a*-602*e*.

Exemplary Cataloging And Making Recommendations Based on Domain-Specific Knowledge Using Machine Learning And Artificial Intelligence With reference to FIG. 2, output(s) of the knowledge engines at block 210 (e.g., the repository engines 212, 214, 216, 218 and 220) may be consumed by one or more trained ML/AI models 230, to create output recommendations regarding business regulations, governance standards, rules and policies based on domain-specific knowledge and implementations that follow the options selected by the customer (e.g., step-by-step or one-click deployment). The ML/AI models 230 advantageously translate complex analysis conventionally done manually (e.g., in house) into ML data enabling training of models to make recommendations based on input from clients and their objectives/needs. Further improvements of the present techniques over conventional techniques are seen in the fact that the ML/AI models 230 may be used not only for an initial domain state change, but also for upkeep—advantageously, the present techniques include ML models, scanners, and rules that help customers to ensure their ongoing compliance with business regulations, governance standards, rules and/or policies, predictively rather than just reactively or proactively. The present techniques represent an advantage over conventional techniques, because humans cannot keep up with the pace of change in business regulations, governance standards, rules and/or policies as they apply to multitudes of domain states or domain state patterns, each comprised of multiple geographic, industry, business function, business process domains.

The present techniques are faster than human-based techniques, given that the present techniques are available 24 hours per day. Still further advantages of the present techniques include the elimination of unconscious bias toward certain domain states, domain patterns, certain domains, business regulations, governance standards, rules and/or policies. For example, the proprietor of the present techniques may have large quantities of institutional knowledge (e.g., knowledge, documents, insight, data, etc.). Knowledge management architects may be biased by what they have always done, whereas the ML/AI model at block 230 may reach a different outcome. People may be biased toward what they know and are comfortable/familiar with. Even if a customer does not know what they want, they still benefit from bias reduction.

In some aspects, the present techniques utilize a champion-challenger algorithm to test different competing solutions, while the solution is running. Challenging patterns and knowledge of system continuously improves innovation and quality of system—the more knowledge/challenge, the better the system becomes. This capability is enabled by translating knowledge of domain states, domain patterns, domains, business regulations, governance standards, rules and/or policies into codified data that is consumable by the knowledge engines and ML models of the present techniques, as discussed herein.

Exemplary Machine Learning Models

Figure 7:
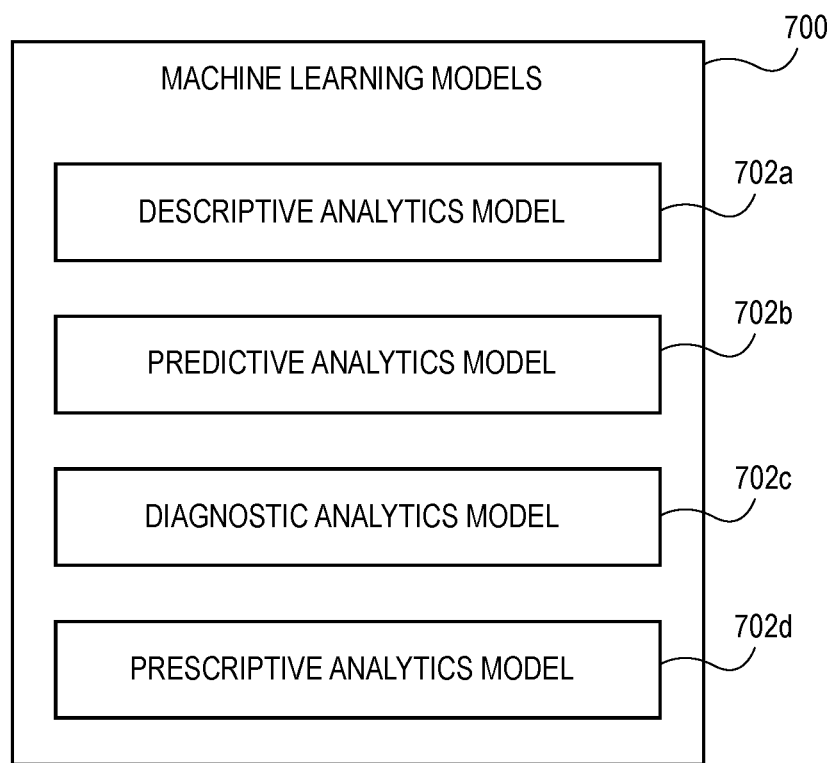
FIG. 7 is an exemplary block diagram depicting exemplary ML and AI models, according to an aspect.

FIG. 7 is an exemplary block diagram depicting exemplary ML/AI models, according to an aspect. At block 700, several individual trained ML/AI models 702*a*-702*d* are depicted. The block 700 may correspond to the block 230 of FIG. 2, in some aspects. Block 702*a* includes a descriptive analytics ML/AI model. Block 702*b* includes a predictive analytics ML/AI model. Block 702*c* includes a diagnostic analytics ML/AI model. Block 702*d* includes a prescriptive analytics ML/AI model. In some aspects, more or fewer ML/AI models 702*a*-702*d* may be included. The ML/AI models 702*a*-702*d* may be trained as discussed herein (e.g., by the ML training module 142 of FIG. 1) and operated as discussed herein (e.g., by the ML operation module 144). The models 702*a*-702*d* may be trained by executing the one or more knowledge engines 210, in some aspects. The training and operation of the models 702*a*-702*d* is discussed in detail, below.

Exemplary Computer-Implemented Machine Learning Model Training and/or Operation

Figure 8A:
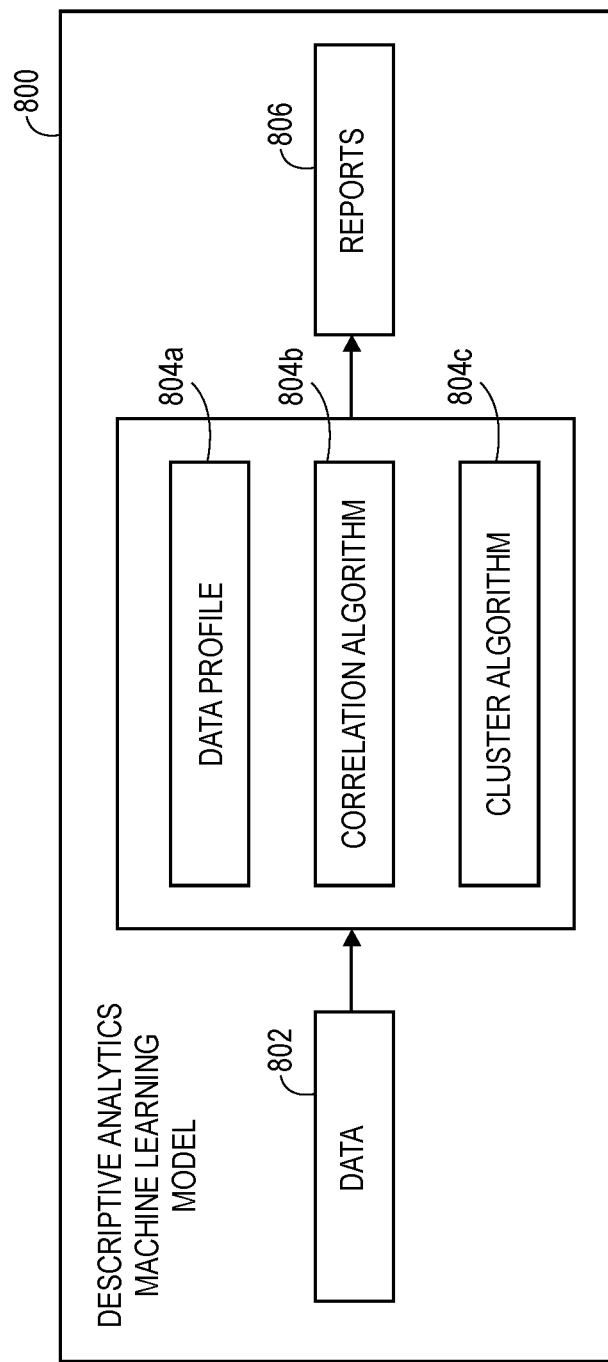
FIG. 8A is an exemplary block flow diagram depicting a computer-implemented method for training and/or operating a descriptive analytics ML model, according to one aspect.

FIG. 8A is an exemplary block flow diagram depicting a computer-implemented method 800 for training and/or operating a descriptive analytics ML model (e.g., the descriptive analytics model of block 702*a*), according to one aspect. In some aspects, the method 800 is a building block of the ML and AI models that comprise block 230 of FIG. 2. Data from various sources may be analyzed in method 800 to understand what rules, regulations, standards and/or policies have been used in the past via profiling, identifying patterns and analyzing correlations between profiling data and outcomes, and by clustering the rules, regulations, standards and/or policies in groups based on different features (e.g., domains).

The method 800 includes receiving/retrieving data at block 802. The data 802 may correspond to (i) data generated by the knowledge engines 212, 214, 216, 218 and 220 at block 210 of FIG. 2, (ii) data representing a current data and domain state, and/or (iii) data representing a future data and domain state. The method 800 includes analyzing the data at blocks 804*a*-804*c*. At block 804*a*, the method 800 may analyze the data 802 to profile, for example, what regulations, standards, rule and/or policies have been used in the past. At block 804*b*, the method 800 may analyze data (e.g., historical data) to identify correlations between the data and outcomes. At block 804*c*, the method may analyze data (e.g., historical data) to (e.g., using unsupervised ML) identify one or more clusters in data. The method 800 may include generating one or more reports at block 806. The reports may include information identified at the blocks 804*a*-804*c*, in some aspects.

Figure 8B:
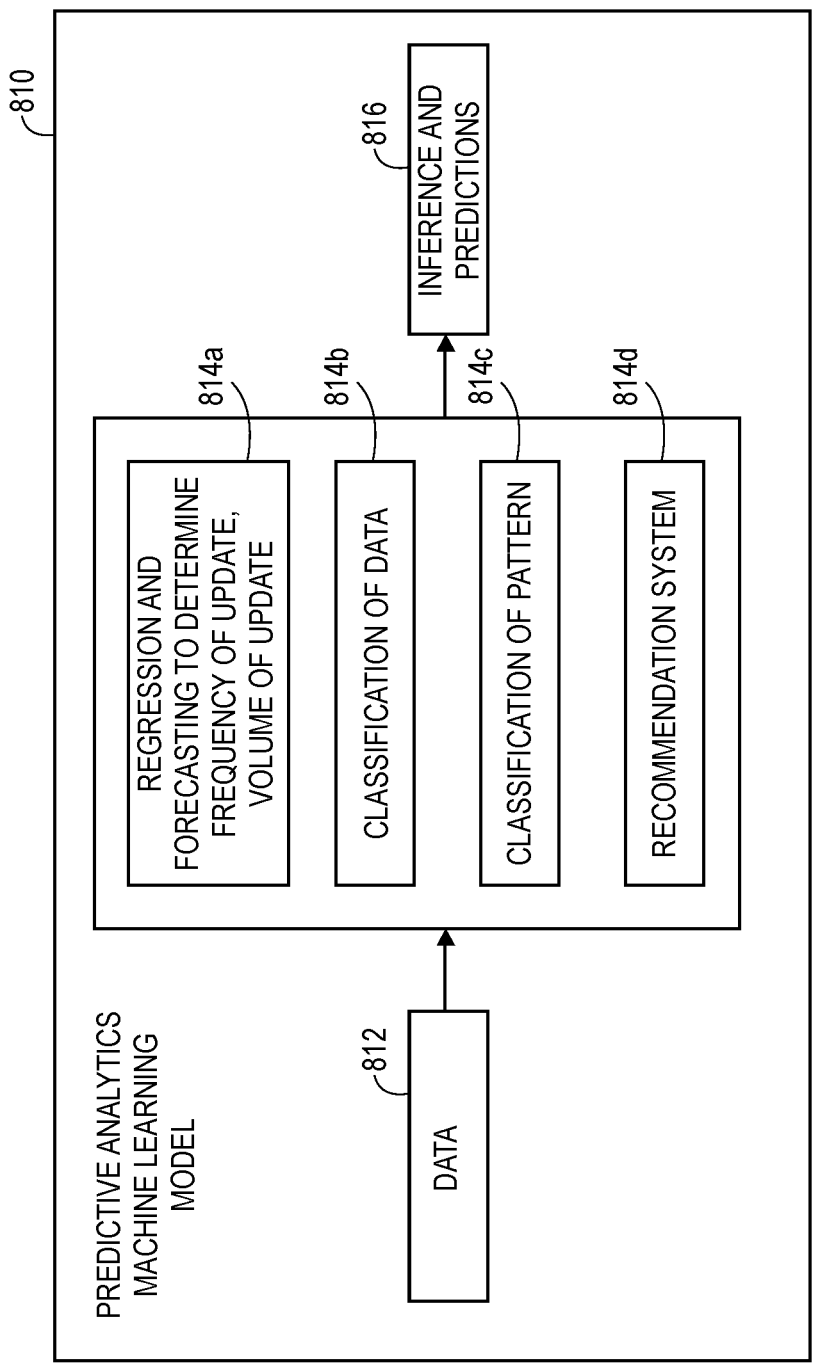
FIG. 8B is an exemplary block flow diagram depicting a computer-implemented method for training and/or operating a predictive analytics ML model, according to one aspect.

FIG. 8B is an exemplary block flow diagram depicting a computer-implemented method 810 for training and/or operating a predictive analytics ML model (e.g., the predictive analytics model of block 702*b*), according to one aspect. In some aspects, the predictive analytics blocks 814*a*-814*d* of the method 810 predict future outcomes based on the existing data at block 812. In operation, the method 810 may be used to predict and forecast frequency of updates and volumes of updates. One or more ML models trained at blocks 814a-814d may be used to classify data from block 812 and to classify different patterns. This method 810 may also be used, in some aspects, to provide recommendations for which regulations, standards, rules and/or policies to comply with.

The method 800 includes receiving/retrieving data at block 812. The data 812 may correspond to (i) data generated by the knowledge engines 212, 214, 216, 218 and 220 at block 210 of FIG. 2, (ii) data representing a current data and domain state, and/or (iii) data representing a future data and domain state. The method 800 includes analyzing the data at blocks 814a-814d. At block 814a, the method 810 may include performing a regression and/or forecasting analysis to determine a frequency of updates to regulations, standards, rules and/or policies, and/or a volume of regulations, standards, rules and/or policies. At block 814b, the method 810 may include classifying regulations, standards, rules and/or policies into one or more categories (e.g., as a binary classification, a multi-class classification, etc.) based on domains, domain patterns and/or domain states. In some aspects, the method 810 may include performing classification of patterns in the regulations, standards, rules and/or policies at block 814c, such as groups of regulations, standards, rules and/or policies associated with various domains, domain states and/or domain state patterns. In some aspects, the method 810 may include a recommendation system at block 814d. The method 810 may include generating one or more inferences and/or predictions at the block 816.

Figure 8C:
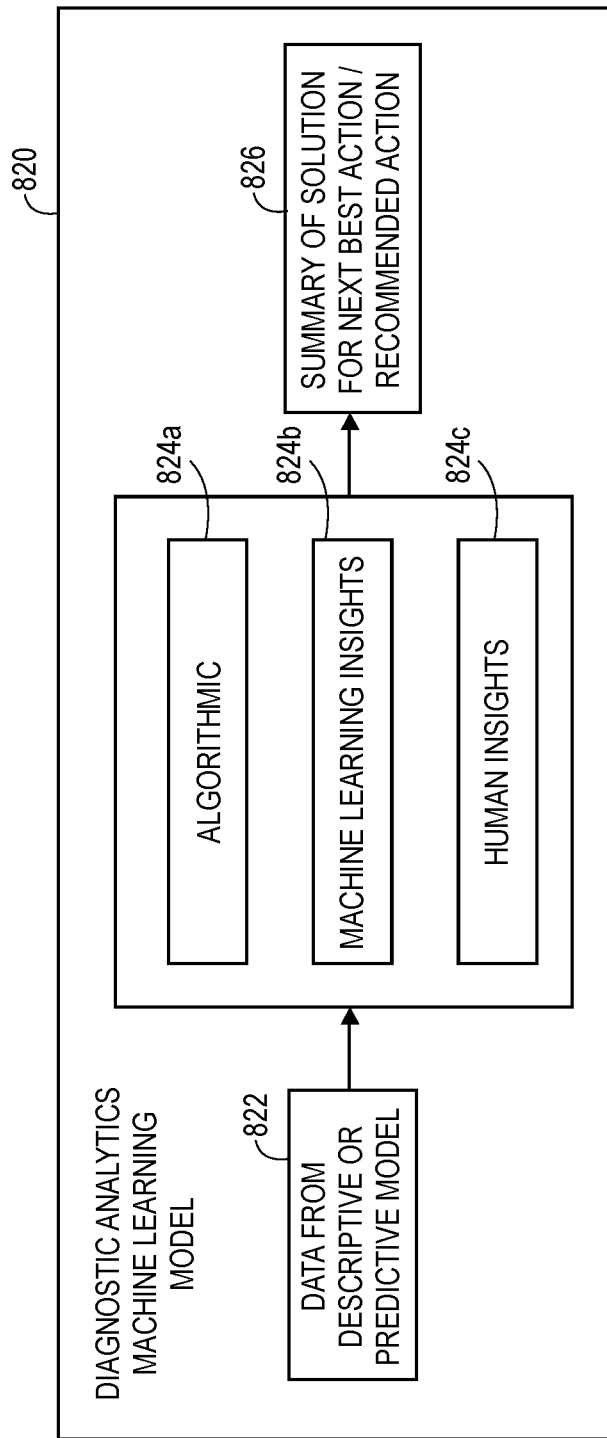
FIG. 8C is an exemplary block flow diagram depicting a computer-implemented method for training and/or operating a diagnostic analytics ML model, according to one aspect.

FIGS. 8C and 8D are exemplary block flow diagrams depicting computer-implemented methods 820 and 830, respectively, for training and/or operating a diagnostic analytics ML model (e.g., the diagnostic analytics model of block 702c), according to two aspects. In operation, the methods 820 and 830 may be building blocks of the ML and AI models that comprise block 230 of FIG. 2. Data from various sources may be analyzed in methods 820 and 830 to understand what has occurred in a running system by drilling down into the data, performing data discovery, performing data mining and/or correlating data.

The method 820 may include, at block 822, receiving/retrieving (i) data from one or more descriptive ML models (e.g., the one or more ML models trained by the method 800), (ii) data from one or more predictive ML models (e.g., the one or more ML models trained by the method 810), (iii) data generated by the knowledge engines 212, 214, 216, 218 and 220 at block 210 of FIG. 2, (iv) data representing a current data and domain state, and/or (v) data representing a future data and domain state. The data at block 822 may include descriptive and/or prescriptive inferences that may be processed at blocks 824a-824c using various approaches. Inferences may be analyzed using an algorithmic approach at block 824a to codify what has happened with past groupings of regulations, standards, rules and/or policies for various domains, domain states, etc., using ML insights at block 824b and/or using human insight at block 824c. The blocks 824 may generate respective summaries of regulations, standards, rules and/or policies to be complied with for next best actions (i.e., one or more recommended actions) at block 826.

The method 830 may receive/retrieve data at block 832 corresponding to the data received at block 822. At blocks 834a-834d, the method 830 may include sets of computer-executable instructions for training and/or operating additional and/or alternative diagnostic ML models to generate one or more reports at block 836 by drilling down into the data at block 834a, by data discovery at block 834b, by data mining at block 834c and/or data correlation at block 834d.

Figure 8E:
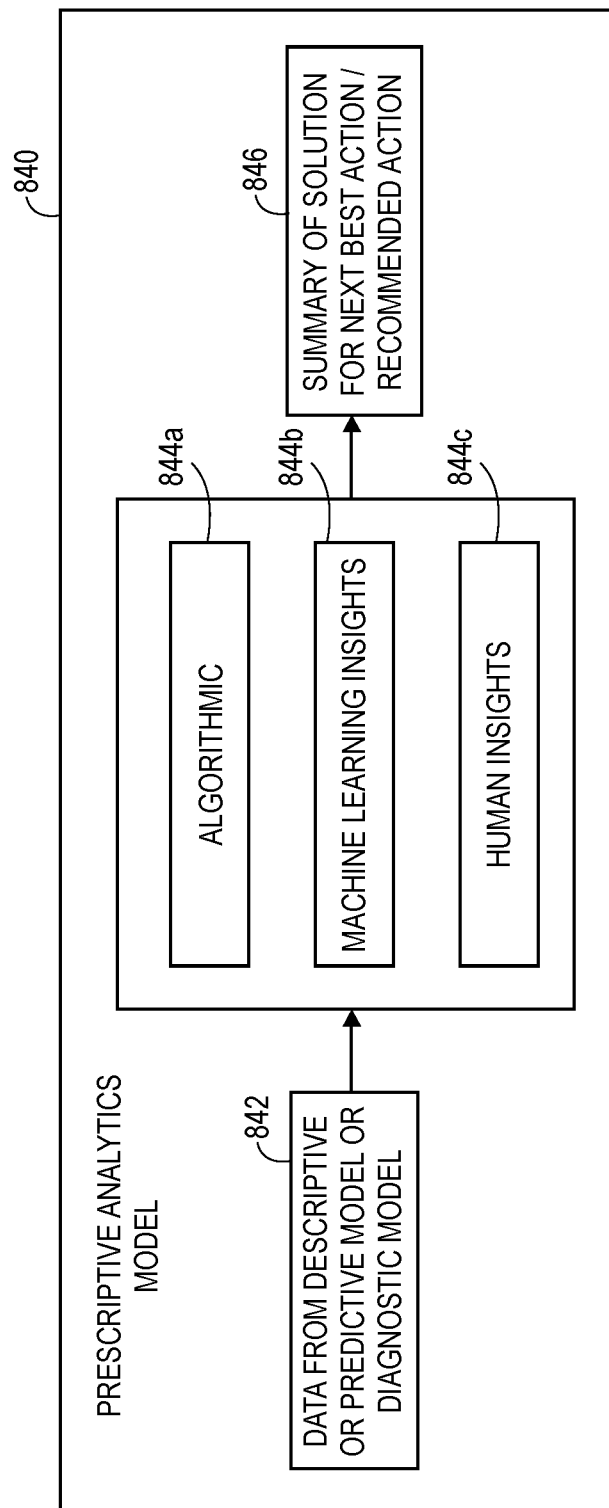
FIG. 8E is an exemplary block flow diagram depicting a computer-implemented method for training and/or operating a prescriptive analytics ML model, according to one aspect.

FIG. 8E is an exemplary block flow diagram depicting a computer-implemented method 840 for training and/or operating a prescriptive analytics ML model (e.g., the prescriptive analytics model of block 702d), according to one aspect. In operation, one or more prescriptive analytics ML models 844a-844c in method 840 may generate one or more prescriptions to showcase the next best set of regulations, standards, rules and/or policies to be complied with based on the data from descriptive, predictive and/or diagnostic ML models. The method 840 may use a blend of algorithmic knowledge, insights generated from ML models and/or human insights, in some aspects.

The method 840 may include, at block 842, receiving/retrieving (i) data from one or more descriptive ML models (e.g., the one or more ML models trained by the method 800), (ii) data from one or more predictive ML models (e.g., the one or more ML models trained by the method 810), (iii) data from one or more diagnostic ML models (e.g., the one or more ML models trained by the methods 820 and 830), (iv) data generated by the knowledge engines 212, 214, 216, 218 and 220 at block 210 of FIG. 2, (v) data representing a current data and domain state, and/or (vi) data representing a future data and domain state.

The data at block 842 may include descriptive, prescriptive and/or diagnostic inferences that may be processed at blocks 844a-844c using various approaches. The blocks 844a-844c may determine one or more summaries of a solution for a next/best set of regulations, standards, rules and/or policies to comply with. Generally, the prescriptive analytics ML model enables the customer and the proprietor of the current techniques to reflect on all domain knowledge building blocks comprising a future data and domain state, by analyzing, for example, options from reinforcement learning, classification, and time to market/cost/frequency models.

For example, the ML/AI models of block 230 of FIG. 2 may analyze a recommended set of regulations, standards, rules and/or policies, and a current architecture based on time to market, cost, frequency, etc. to make a recommendation. For example, the ML/AI models may assign a cost score using ML based on predicted costs associated with certain changes to the architecture to comply with identified set. The ML/AI models may also assign time to market scores, risk scores, etc. associated with an upgrade that complies with a certain amount of the recommended set of regulations, standards, rules, policies, etc. Then the ML/AI models could combine the scores in some manner and compare the scores to determine which options are the best to recommend.

Exemplary Output Engine Computer-Implemented Methods

Figure 9:
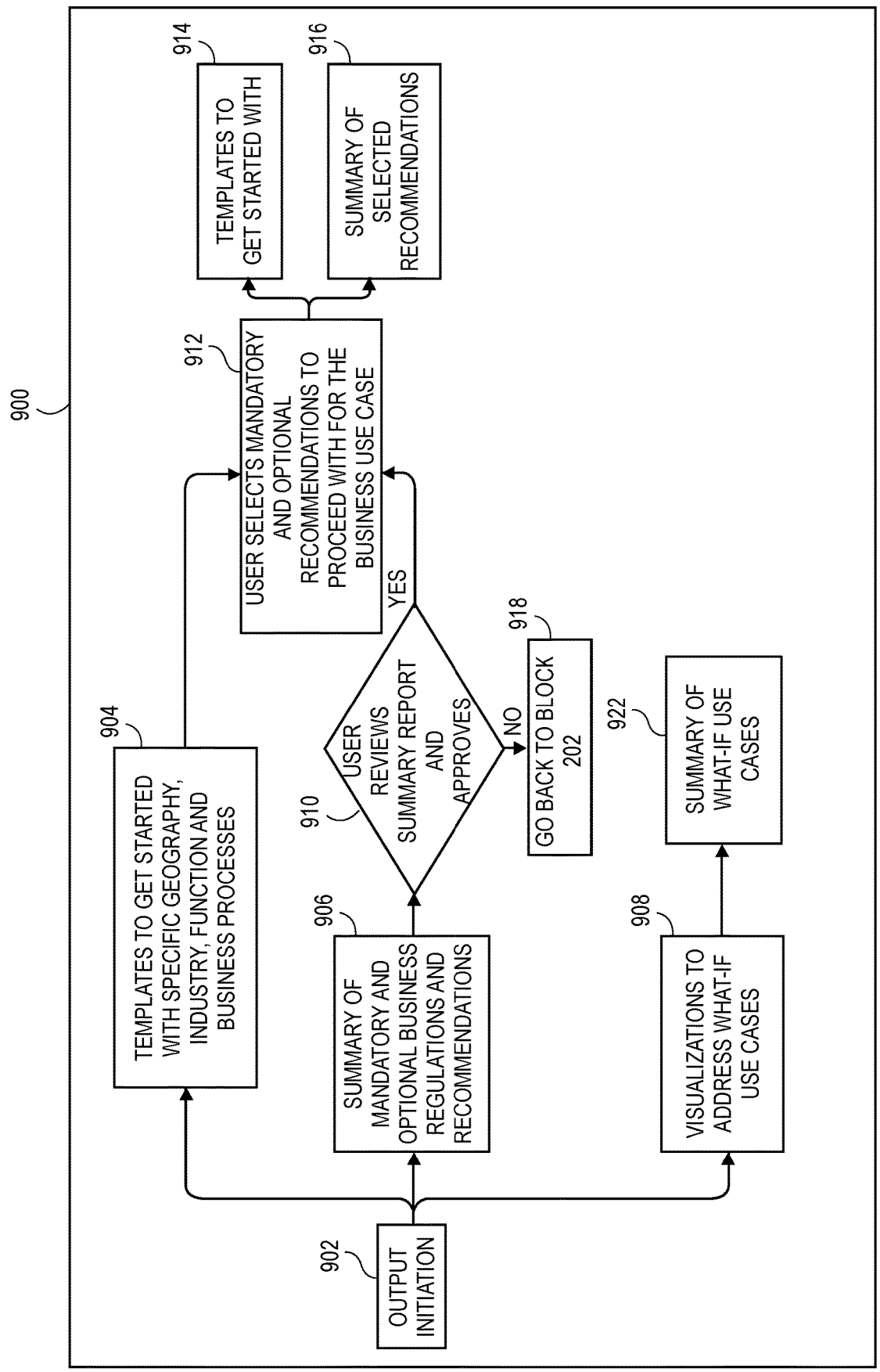
FIG. 9 is an exemplary block flow diagram depicting a computer-implemented output engine method, according to an aspect.

FIG. 9 is an exemplary block flow diagram depicting a computer-implemented output engine method 900, according to an aspect. For example, the output engine method 900 may correspond to block 240 of FIG. 2. At block 902, an output initiation procedure may process output of one or more of the methods of FIGS. 8A-8E. At block 902, the method 900 initiates an output operation. At block 904, the method 900 generates one or more templates that represent the domains of a future data and domain state. The one or more templates may be generated based on output(s) of, for example, the method 202 and/or the method 208.

At block 906, the method 900 may generate a summary of a recommended (mandatory and optional) set of business regulations, governance standards, rules and/or policies to comply with for the future data and domain state. At block 908, the method 900 may generate visualizations (block 908) and a summary (block 922) of additional and/or alternative sets of business regulations, governance standards, rules and/or policies to comply with for additional and/or alternative future data and domain states at block 908. The visualizations and summary may enable a customer to access what-if domain state use cases. For example, to understand differences in required business regulations, governance standards, rules and/or policies between (i) locating a facility in geographic region A versus geographic region B, (ii) implementing a system immediately versus waiting six months, (iii) between using one technology versus another technology, (iv) downsides/risks associated with not complying with a particular recommendation, etc. In some examples, the method at block 908 creates low code/no code visualizations to visualize, discover and generate insights with or without coding skills. For example, in some aspects, block 908 provides a what you see is what you get (WYSIWYG) visualization tool for generating visualizations. In some aspects, block 908 generates visualizations using more complex tools (e.g., visualization libraries such as Matplotlib, D3, etc.).

The method 900 may collect a user approval of the summary of block 910, and then a user may select at block 912 one or more of the recommended set of business regulations, governance standards, rules and/or policies of the options for implementation.

If the user does not approve of one or more of the recommendations at block 910, the method 900 may revert to an earlier method (e.g., to the acceleration and readiness system 202 of FIG. 2 and/or the method 300 of FIG. 3) to collect additional information from the user and the user's current and/or future data and domain states, as at block 918.

Next, the method 900 creates one or more templates 914 representing the business regulations, governance standards, rules and/or policies selected at block 912. The method 900 may generate and present a summary 916 of the selected recommendations.

In some aspects, the template(s) 914 are codified as machine data that can be analyzed by the system 250 of FIG. 2 using, inter alia, ML techniques for environmental discovery, environmental validation, and automated knowledge engine generation, and more particularly, for training and operating one or more ML models to analyze current and future architecture state information and generate infrastructure-as-code ready-to-deploy pipelines which can automatically deploy the components based on a preferred target (e.g., on-premise or cloud platform) that complies with the business regulations, governance standards, rules and/or policies identified in the template(s) 914. For example, system 250 may analyze, using one or more ML models, the templates and data representing a current data and architecture state corresponding to a current computing environment to generate a summary of one or more cloud deployment options for migrating the current computing environment to another computing environment for the future data and domain state; and cause the summary of the one or more cloud deployment options to be displayed on a computing device, such as the client device 102. In some aspects, the system at block 250 also analyzes, using the one or more ML models, data representing a future data and architecture state corresponding to a future computing environment to generate the summary of one or more cloud deployment options for migrating the current computing environment to the future computing environment for the future data and domain state.

Exemplary Computer-Implemented Continuous Deployment Methods

As noted, the methods disclosed herein may continuously retrain one or more ML models and update a set of recommended business regulations, governance standards, rules and/or policies to be complied with based on new predictive outcomes. For example, the ML model at block 634c of the method 630 of FIG. 6D may be continuously updated. In an aspect, the method periodically (depending upon the user preference, e.g., quarterly, every 6 months, every year etc.) monitors the current landscape of business regulations, governance standards, rules and/or policies for changes, upcoming changes, etc. and updates a recommended set of business regulations, governance standards, rules and/or policies to be complied with. In some examples, system 250 may include instructions for regenerating infrastructure-as-code when any underlying recommendations regarding a future data and domain state is identified.

Figure 10A:
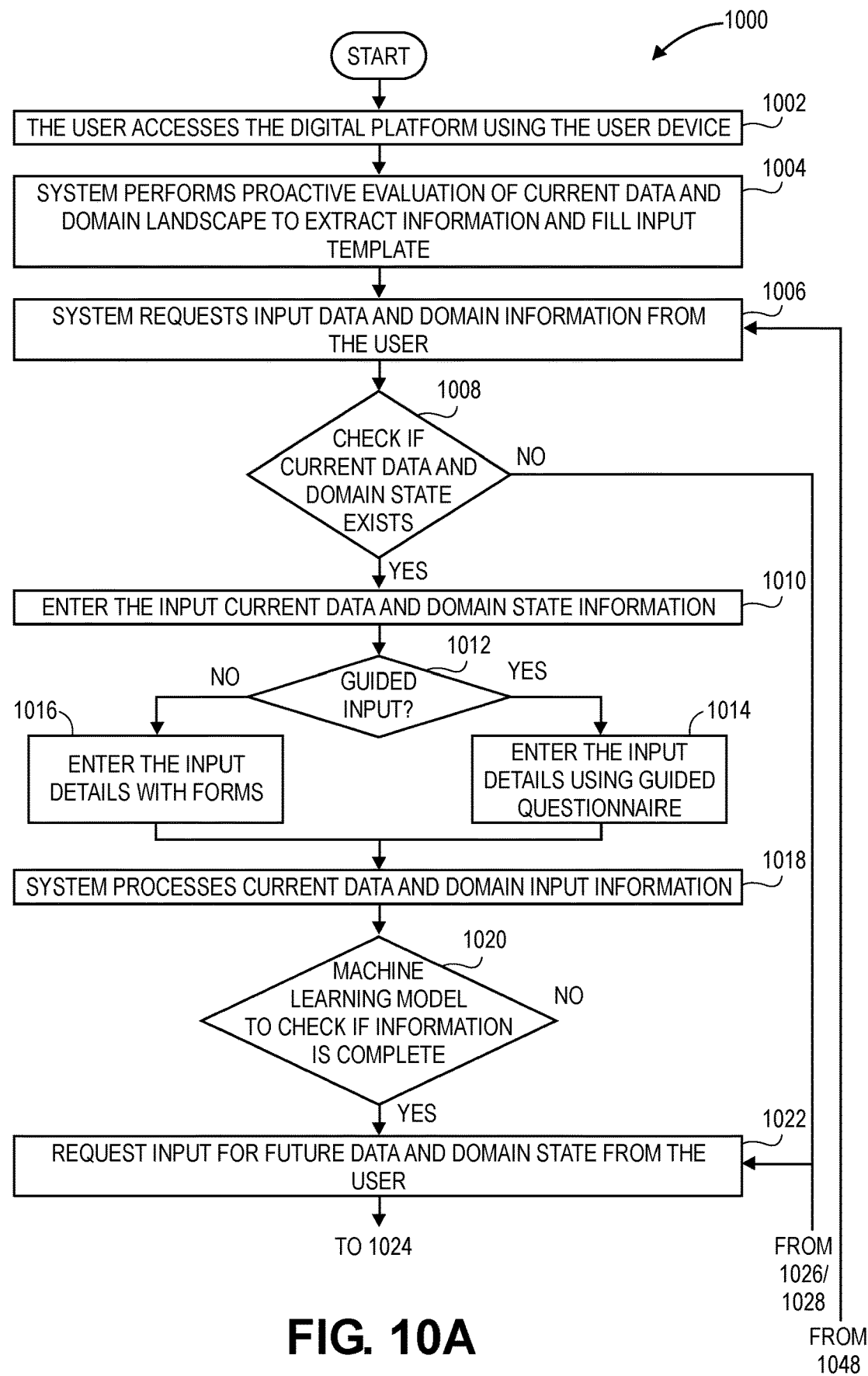
FIGS. 10A, 10B and 10C are an exemplary flow diagram depicting a computer-implemented method for cataloging and making recommendations based on domain-specific knowledge, according to an aspect.
Figure 10B:
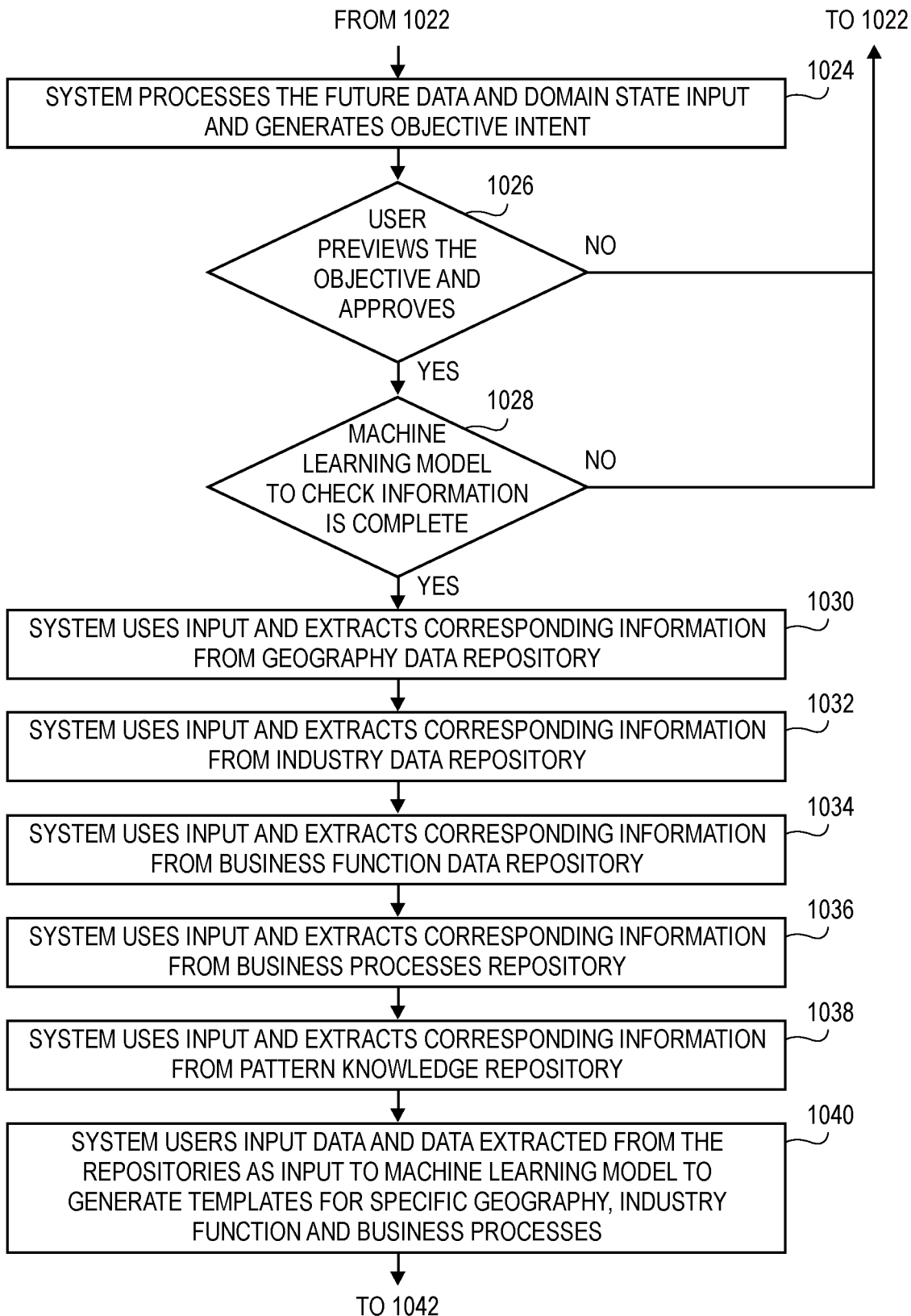
Figure 10C:
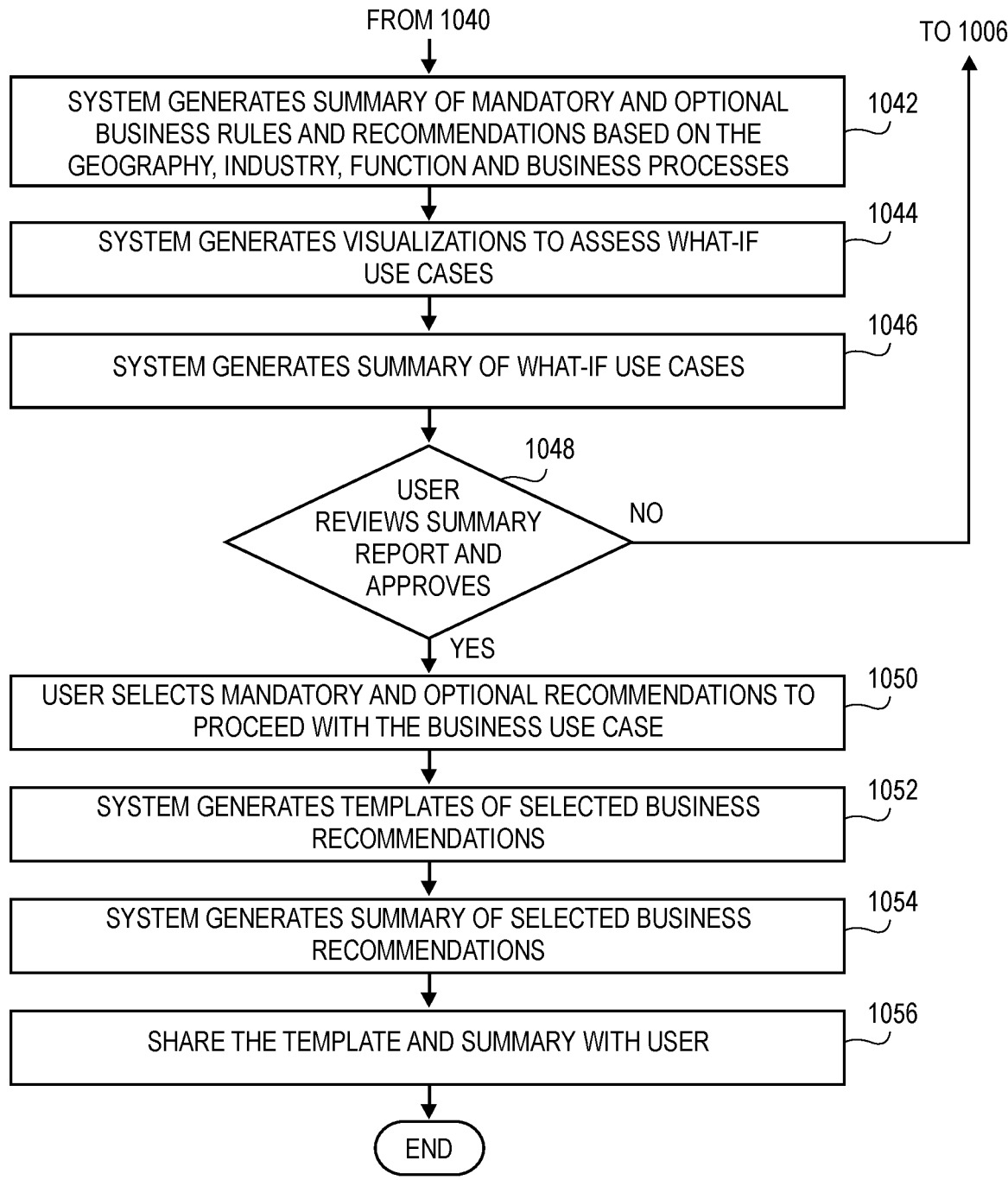

Exemplary Cataloging and Making Recommendations Based on Domain-Specific Knowledge Using Machine Learning and Artificial Intelligence Modeling Methods FIG. 10A, FIG. 10B and FIG. 10C collectively depict an exemplary flow diagram depicting a computer-implemented method 1000 for cataloging and making recommendations based on domain-specific knowledge, according to an aspect.

The method 1000 includes receiving user access (block 1002). The user access may occur at the server 104, whereupon the user accesses the server 104 via the client computing device 102. The user may be the customer or a proprietor employee, in some aspects. The server 104 may facilitate access (e.g., via the I/O module 146).

The method 1000 may include extracting current data and domain state information by, for example, proactively evaluating a current computing environment 106. For example, evaluating the current data and domain state may include scanning a current computing environment 106, for example, as discussed above with respect to FIG. 2 and FIG. 3. If needed, the method 1000 may request input data and domain information from the user at block 1006.

The method 1000 may include determining whether a current data and domain state exists (block 1008), for example, as discussed with respect to block 404 of FIG. 4. When the current data and domain state does not exist, control may proceed to the block 1022 to request information regarding a future data and domain state.

Otherwise, when a current data and domain state exists, the domain state information may be analyzed and entered into an electronic template form (block 1010), as discussed above with respect to the method 500 of FIG. 5.

The method may determine whether the user desires a guided input or unattended input session (block 1012), for example, as discussed above with respect to block 406 of FIG. 4. When the user desires an unguided input session at block 1012, the method 1000 may include receiving form input from one or more trained ML models (block 1014). For example, the trained ML model may be trained and operated by the validation module 150, and operated in a loop as discussed with respect to the method 400 of FIG. 4. Responses of the user may be processed using NLP, as discussed with respect to FIG. 5. Otherwise, when the user desires a guided input session at block 1012, the method may include collecting information from the user via the I/O module 146 of FIG. 1, in a guided questionnaire procedure (block 1016).

The method 1000 may include processing the output of the ML-based procedure at block 1014, and/or the guided questionnaire at block 1016 (block 1018) to determine whether the current data and domain state is valid (block 1020). When the current data and domain state is invalid, control flow of the method 100 may return to the block 1006 to seek further information regarding the current data and domain state.

Otherwise, when the input data and domain state is valid (block 1020), the method may include requesting input regarding a future data and domain state from the user (block 1022).

The method 1000 may process the future data and domain state input information, and generate one or more objectives and intents (block 1024). This step may include processing user responses with NLP, as discussed above. The method 1000 may include providing the user with a preview of the objectives (block 1026). If the user does not approve (block 1026), control may return to block 1024 to obtain alternative and/or additional future data and domain state information.

Otherwise, when the user approves the objectives (block 1026), the method 1000 may analyze the future data and domain state information to determine whether it is valid (block 1028). If the future state is not valid at block 1028, control may return to the block 1024 to obtain alternative and/or additional future data and domain state information.

Otherwise, when the future state is valid (block 1028), the method 1000 may include collecting and analyzing data to form a geography data repository (e.g., the repository 606 of FIG. 6A) (block 1030), collecting and analyzing data to form an industry data repository (e.g., the repository 616 of FIG. 6B) (block 1032), collecting and analyzing data to form a business function data repository (e.g., the repository 626 of FIG. 6C) (block 1034), collecting and analyzing data to form a business process data repository (e.g., the repository 636 of FIG. 6D) (block 1036), and collecting and analyzing data to form a pattern knowledge repository (e.g., the repository 646 of FIG. 6E) (block 1038). The data may include input data representing the current data and domain state, and/or the future data and domain state.

At block 1040, the method 1000 analyzes (i) data extracted from one or more of the data repositories, (ii) input data representing a current data and domain state and/or (iii) input data representing a future data and domain state to generate one or more templates for specific geographies, industries, business functions and/or business processes.

At block 1042, the method 1000 generates a summary of business regulations, governance standards, rules and/or policies that are recommended based on the specific geographies, industries, business functions and/or business processes.

At block 1044, the method 1000 generates one or more visualizations that assess various what-if use cases for alternative and/or additional different future data and domain states. The method 1000 generates a summary of the what-if use cases, at block 1046.

If the user does not, at block 1048, does not approve the summary generated at block 1042, control returns to block 1006 to seek further information regarding the current data and domain state or to block 1022 to seek further information regarding the future data and domain state.

Otherwise, the user selects one or more of the recommended set of business regulations, governance standards, rules and/or policies (block 1050). At block 1052, the method 1000 creates one or more templates representing the business regulations, governance standards, rules and/or policies selected. The method 1000 may generate and present a summary of the selected recommendations at block 1054, and shares the one or more templates and the summary with the user at block 1056.

In some aspects, the template(s) are codified as machine data that can be analyzed by the system 250 of FIG. 2 using, inter alia, ML techniques for environmental discovery, environmental validation, and automated knowledge engine generation, and more particularly, for training and operating one or more ML models to analyze current and future architecture state information and generate infrastructure-as-code ready-to-deploy pipelines which can automatically deploy the components based on a preferred target (e.g., on-premise or cloud platform) that complies with the business regulations, governance standards, rules and/or policies identified in the template(s) 914. For example, system 250 may analyze, using one or more ML models, the templates and data representing a current data and architecture state corresponding to a current computing environment to generate a summary of one or more cloud deployment options for migrating the current computing environment to another computing environment for the future data and domain state; and cause the summary of the one or more cloud deployment options to be displayed on a computing device, such as the client device 102. In some aspects, the system at block 250 also analyzes, using the one or more ML models, data representing a future data and architecture state corresponding to a future computing environment to generate the summary of one or more cloud deployment options for migrating the current computing environment to the future computing environment for the future data and domain state.

Additional Considerations

With the foregoing, users whose data is being collected and/or utilized may first opt-in. After a user provides affirmative consent, data may be collected from the user's device (e.g., a mobile computing device). In other embodiments, deployment and use of neural network models at a client or user device may have the benefit of removing any concerns of privacy or anonymity, by removing the need to send any personal or private data to a remote server.

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "one example" or "an embodiment" means that a particular element, feature, structure, or characteristic described in connection with the embodiment is included in at least one embodiment. The appearances of the phrase "in one embodiment," "one example" or "an one aspect" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a building environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a building environment, an office environment, or a server farm). In other example embodiments, the one or more processors or processor-implemented modules may be distributed across a number of geographic locations.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Upon reading this disclosure, those of skill in the art will appreciate still additional alternative structural and functional designs for the method and systems described herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following embodiments:

1. A computer-implemented method for cataloging and making recommendations based on domain-specific knowledge, the method comprising:
   collecting, using one or more network interfaces, data representative of business regulations, governance standards, rules and/or policies from a plurality of data sources;
   cataloging, using one or more knowledge engines, the collected data to develop a plurality of knowledge repositories for respective ones of a plurality of domains;
   obtaining first domain state data representing one or more domains for a current domain state;
   obtaining second domain state data representing one or more domains for a future domain state;
   analyzing, using one or more first machine learning (ML) models, one or more of (i) first data from the plurality of knowledge repositories, (ii) the first domain state data, and (iii) the second domain state data to identify a recommended set of one or more regulations, standards, policies and/or rules to be complied with for the future domain state;
   analyzing, using one or more second ML models, (i) second data representing the recommended set of one or more business regulations, standards, policies and/or rules to be complied with for the future domain state and (ii) third data representing a current data and architecture state corresponding to a current computing environment to generate a summary of one or more cloud deployment options for migrating the current computing environment to a future computing environment for the future domain state based on the set of one or more regulations, standards, policies and/or rules to be complied with for the future domain state; and
   causing the summary of the one or more cloud deployment options to be displayed on a computing device.

2. The method of embodiment 1, wherein analyzing the second data and the third data to generate the summary of one or more cloud deployment options further includes analyzing, using the one or more second ML models, fourth data representing a future data and architecture state corresponding to a future computing environment.

3. The method of embodiment 1, wherein obtaining the current domain state data includes:
   identifying, from a user via a causative questionnaire, one or more applicable domains; and
   creating the first domain state data by filling in one or more entries of an electronic template based on the identified one or more applicable domains.

4. The method of embodiment 3, wherein identifying the one or more applicable domains includes processing one or more user inputs using natural language processing to determine the one or more applicable domains.

5. The method of embodiment 1, further comprising training the one or more knowledge engines by analyzing a first portion of the data collected from the plurality of data sources.

6. The method of embodiment 1, wherein each of the one or more knowledge engines catalogs the collected data according to a respective domain category.

7. The method of embodiment 1, wherein a first knowledge engine of the one or more knowledge engines catalogs the collected data based on past usage patterns of regulations, standards, policies and/or rules.

8. The method of embodiment 7, further comprising, in response to collecting new data regarding a past usage pattern, re-training the first knowledge engine.

9. The method of embodiment 1, further comprising training the one or more first ML models by analyzing data from the plurality of knowledge repositories.

10. The method of embodiment 1, wherein the one or more first ML models include at least one of a descriptive analytics ML model, a predictive analytics ML model, a diagnostic analytics ML model, or a prescriptive analytics ML model.

11. The method of embodiment 1, further comprising, in response to collecting new data from the data sources, re-training one or more of the first ML models and the second ML models.

12. The method of embodiment 1, wherein the data sources include at least one of an internal proprietary database, a video repository, a blog, a news repository, a webpage, a government database, or a business database.

13. The method of embodiment 1, further comprising providing a visualization of what-if domain state use cases that includes at least one low code/no code visualization 14. The method of embodiment 1, wherein the one or more cloud deployment options include at least one of a one click deployment option or a manual deployment option with step-by-step instructions.

15. A computing system for cataloging and making recommendations based on domain-specific knowledge, the computing system comprising:
one or more processors; and
a non-transitory, computer-readable storage medium storing computer-readable instructions that, when executed by the one or more processors, cause the computing system to:
collect data representative of business regulations, governance standards, rules and/or policies from a plurality of data sources;
catalog, using one or more knowledge engines, the collected data to develop a plurality of knowledge repositories for respective ones of a plurality of domains;
obtain first domain state data representing one or more domains for a current domain state;
obtain second domain state data representing one or more domains for a future domain state;
analyze, using one or more first machine learning (ML) models, one or more of (i) first data from the plurality of knowledge repositories, (ii) the first domain state data, and (iii) the second domain state data to identify a recommended set of one or more regulations, standards, policies and/or rules to be complied with for the future domain state;
analyze, using one or more second ML models, (i) second data representing the recommended set of one or more business regulations, standards, policies and/or rules to be complied with for the future domain state and (ii) third data representing a current data and architecture state corresponding to a current computing environment to generate a summary of one or more cloud deployment options for migrating the current computing environment to a future computing environment for the future domain state based on the set of one or more regulations, standards, policies and/or rules to be complied with for the future domain state; and
cause the summary of the one or more cloud deployment options to be displayed on a computing device.

16. The computing system of embodiment 15, wherein the instructions, when executed by the one or more processors, cause the system to analyze the second data and the third data to generate the summary of one or more cloud deployment options further by analyzing, using the one or more second ML models, fourth data representing a future data and architecture state corresponding to a future computing environment.

17. The computing system of embodiment 15, wherein the instructions, when executed by the one or more processors, cause the system to obtain the current domain state data by:
identifying, from a user via a causative questionnaire, one or more applicable domains; and
creating the first domain state data by filling in one or more entries of an electronic template based on the identified one or more applicable domains.

18. The computing system of embodiment 15, wherein each of the one or more knowledge engines catalogs the collected data according to a respective domain category.

19. The computing system of embodiment 15, wherein a first knowledge engine of the one or more knowledge engines catalogs the collected data based on past usage patterns of regulations, standards, policies and/or rules.

20. The computing system of embodiment 19, further comprising, in response to collecting new data regarding a past usage pattern, re-training the first knowledge engine.

21. The computing system of embodiment 15, wherein the instructions, when executed by the one or more processors, cause the system to train the one or more first ML models by analyzing data from the plurality of knowledge repositories.

22. The computing system of embodiment 15, wherein the one or more first ML models include at least one of a descriptive analytics ML model, a predictive analytics ML model, a diagnostic analytics ML model, or a prescriptive analytics ML model.

23. A non-transitory, computer-readable, storage medium storing computer-readable instructions that, when executed by one or more processing devices, cause a system to:
collect data representative of business regulations, governance standards, rules and/or policies from a plurality of data sources;
catalog, using one or more knowledge engines, the collected data to develop a plurality of knowledge repositories for respective ones of a plurality of domains;
obtain first domain state data representing one or more domains for a current domain state;
obtain second domain state data representing one or more domains for a future domain state;
analyze, using one or more first machine learning (ML) models, one or more of (i) first data from the plurality of knowledge repositories, (ii) the first domain state data, and (iii) the second domain state data to identify a recommended set of one or more regulations, standards, policies and/or rules to be complied with for the future domain state;
analyze, using one or more second ML models, (i) second data representing the recommended set of one or more business regulations, standards, policies and/or rules to be complied with for the future domain state and (ii) third data representing a current data and architecture state corresponding to a current computing environment to generate a summary of one or more cloud deployment options for migrating the current computing environment to a future computing environment for the future domain state based on the set of one or more regulations, standards, policies and/or rules to be complied with for the future domain state; and
cause the summary of the one or more cloud deployment options to be displayed on a computing device.

24. The storage medium of embodiment 23, wherein the instructions, when executed by the one or more processors, cause the system to analyze the second data and the third data to generate the summary of one or more cloud deployment options further by analyzing, using the one or more second ML models, fourth data representing a future data and architecture state corresponding to a future computing environment.

25. The storage medium of embodiment 23, wherein the instructions, when executed by the one or more processors, cause the system to cause each of the one or more knowledge engines to catalog the collected data according to a respective domain category.

26. The storage medium of embodiment 23, wherein the instructions, when executed by the one or more processors, cause the system to cause a first knowledge engine of the one or more knowledge engines to catalog the collected data based on past usage patterns of regulations, standards, policies and/or rules.

27. The storage medium of embodiment 26, wherein the instructions, when executed by the one or more processors, cause the system to, in response to collecting new data regarding a past usage pattern, re-train the first knowledge engine.

28. The storage medium of embodiment 23, wherein the instructions, when executed by the one or more processors, cause the system to train the one or more first ML models by analyzing data from the plurality of knowledge repositories.

29. The storage medium of embodiment 23, wherein the one or more first ML models include at least one of a descriptive analytics ML model, a predictive analytics ML model, a diagnostic analytics ML model, or a prescriptive analytics ML model.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed:

1. A computer-implemented method for cataloging and making recommendations based on domain-specific knowledge, the method comprising:
    collecting, using one or more network interfaces, data representative of business regulations, governance standards, rules and/or policies from a plurality of data sources;
    cataloging, via one or more processors using one or more automated knowledge engines, the data to develop a plurality of knowledge repositories for respective ones of a plurality of domains;
    obtaining first domain state data representing one or more domains for a current domain state;
    obtaining second domain state data representing one or more domains for a future domain state;
    analyzing, using one or more trained first machine learning (ML) models, one or more of (i) first data from the plurality of knowledge repositories, (ii) the first domain state data, and (iii) the second domain state data to identify a recommended set of one or more business regulations, standards, policies and/or rules to be complied with for the future domain state;
    re-training one or more of the one or more first ML models based upon feedback resulting from past usage of recommended sets of business regulations, standards, policies and/or rules recommended by the one or more first ML models;
    analyzing, using one or more trained second ML models, (i) second data representing the recommended set of one or more business regulations, standards, policies and/or rules to be complied with for the future domain state and (ii) third data representing a current data and architecture state corresponding to a current computing environment to generate a summary of one or more cloud deployment options for migrating the current computing environment to a future computing environment for the future domain state based on the set of one or more business regulations, standards, policies and/or rules to be complied with for the future domain state, wherein at least a portion of the recommended set is (i) output by the one or more trained first ML models and (ii) received as input by at least one of the one or more trained second ML models; and
    causing the summary of the one or more cloud deployment options to be displayed on a computing device.

2. The method of claim 1, wherein analyzing the second data and the third data to generate the summary of one or more cloud deployment options further includes analyzing, using the one or more second ML models, fourth data representing a future data and architecture state corresponding to a future computing environment.

3. The method of claim 1, wherein obtaining the current domain state data includes:
    identifying, from a user via a causative questionnaire, one or more applicable domains; and
    creating the first domain state data by filling in one or more entries of an electronic template based on the one or more applicable domains.

4. The method of claim 3, wherein identifying the one or more applicable domains includes processing one or more user inputs using natural language processing to determine the one or more applicable domains.

5. The method of claim 1, further comprising training the one or more knowledge engines by analyzing a first portion of the data collected from the plurality of data sources.

6. The method of claim 1, wherein each of the one or more knowledge engines catalogs the data representative of business regulations, governance standards, rules and/or policies according to a respective domain category.

7. The method of claim 1, wherein a first knowledge engine of the one or more knowledge engines catalogs the data representative of business regulations, governance standards, rules and/or policies based on past usage patterns of business regulations, standards, policies and/or rules.

8. The method of claim 7, further comprising, in response to collecting new data regarding a past usage pattern, re-training the first knowledge engine.

9. The method of claim 1, further comprising training the one or more first ML models by analyzing data from the plurality of knowledge repositories.

10. The method of claim 1, wherein the one or more first ML models include at least one of a descriptive analytics ML model, a predictive analytics ML model, a diagnostic analytics ML model, or a prescriptive analytics ML model.

11. The method of claim 1, further comprising, in response to collecting new data from the data sources, re-training one or more of the first ML models and the second ML models.

12. The method of claim 1, wherein the data sources include at least one of an internal proprietary database, a video repository, a blog, a news repository, a webpage, a government database, or a business database.

13. The method of claim 1, further comprising providing a visualization of what-if domain state use cases that includes at least one low code/no code visualization.

14. The method of claim 1, wherein the one or more cloud deployment options include at least one of a one click deployment option or a manual deployment option with step-by-step instructions.

15. A computing system for cataloging and making recommendations based on domain-specific knowledge, the computing system comprising:
one or more processors; and
a non-transitory, computer-readable storage medium storing computer-readable instructions that, when executed by the one or more processors, cause the computing system to:
collect data representative of business regulations, governance standards, rules and/or policies from a plurality of data sources;
catalog, via the one or more processors using one or more automated knowledge engines, the data to develop a plurality of knowledge repositories for respective ones of a plurality of domains;
obtain first domain state data representing one or more domains for a current domain state;
obtain second domain state data representing one or more domains for a future domain state;
analyze, using one or more trained first machine learning (ML) models, one or more of (i) first data from the plurality of knowledge repositories, (ii) the first domain state data, and (iii) the second domain state data to identify a recommended set of one or more business regulations, standards, policies and/or rules to be complied with for the future domain state;
re-train one or more of the one or more first ML models based upon feedback resulting from past usage of recommended sets of business regulations, standards, policies and/or rules recommended by the one or more first ML models;
analyze, using one or more trained second ML models, (i) second data representing the recommended set of one or more business regulations, standards, policies and/or rules to be complied with for the future domain state and (ii) third data representing a current data and architecture state corresponding to a current computing environment to generate a summary of one or more cloud deployment options for migrating the current computing environment to a future computing environment for the future domain state based on the set of one or more business regulations, standards, policies and/or rules to be complied with for the future domain state, wherein at least a portion of the recommended set is (i) output by the one or more trained first ML models and (ii) received as input by at least one of the one or more trained second ML models; and
cause the summary of the one or more cloud deployment options to be displayed on a computing device.

16. The computing system of claim 15, wherein the instructions, when executed by the one or more processors, cause the system to analyze the second data and the third data to generate the summary of one or more cloud deployment options further by analyzing, using the one or more second ML models, fourth data representing a future data and architecture state corresponding to a future computing environment.

17. The computing system of claim 15, wherein the instructions, when executed by the one or more processors, cause the system to obtain the current domain state data by:
identifying, from a user via a causative questionnaire, one or more applicable domains; and
creating the first domain state data by filling in one or more entries of an electronic template based on the one or more applicable domains.

18. The computing system of claim 15, wherein each of the one or more knowledge engines catalogs the data according to a respective domain category.

19. The computing system of claim 15, wherein a first knowledge engine of the one or more knowledge engines catalogs the data representative of business regulations, governance standards, rules and/or policies based on past usage patterns of business regulations, standards, policies and/or rules.

20. The computing system of claim 19, further comprising, in response to collecting new data regarding a past usage pattern, re-training the first knowledge engine.

21. The computing system of claim 15, wherein the instructions, when executed by the one or more processors, cause the system to train the one or more first ML models by analyzing data from the plurality of knowledge repositories.

22. The computing system of claim 15, wherein the one or more first ML models include at least one of a descriptive analytics ML model, a predictive analytics ML model, a diagnostic analytics ML model, or a prescriptive analytics ML model.

23. A non-transitory, computer-readable, storage medium storing computer-readable instructions that, when executed by one or more processing devices, cause a system to:
collect data representative of business regulations, governance standards, rules and/or policies from a plurality of data sources;
catalog, via one or more processors using one or more automated knowledge engines, the data to develop a plurality of knowledge repositories for respective ones of a plurality of domains;
obtain first domain state data representing one or more domains for a current domain state;
obtain second domain state data representing one or more domains for a future domain state;
analyze, using one or more trained first machine learning (ML) models, one or more of (i) first data from the plurality of knowledge repositories, (ii) the first domain state data, and (iii) the second domain state data to identify a recommended set of one or more business regulations, standards, policies and/or rules to be complied with for the future domain state;
re-training one or more of the one or more first ML models based upon feedback resulting from past usage of recommended sets of business regulations, standards, policies and/or rules recommended by the one or more first ML models;
analyze, using one or more trained second ML models, (i) second data representing the recommended set of one or more business regulations, standards, policies and/or rules to be complied with for the future domain state and (ii) third data representing a current data and architecture state corresponding to a current computing environment to generate a summary of one or more cloud deployment options for migrating the current computing environment to a future computing environment for the future domain state based on the set of one or more business regulations, standards, policies and/or rules to be complied with for the future domain state, wherein at least a portion of the recommended set is (i) output by the one or more trained first ML models and (ii) received as input by at least one of the one or more trained second ML models; and cause the summary of the one or more cloud deployment options to be displayed on a computing device.

24. The storage medium of claim 23, wherein the instructions, when executed by the one or more processors, cause the system to analyze the second data and the third data to generate the summary of one or more cloud deployment options further by analyzing, using the one or more second ML models, fourth data representing a future data and architecture state corresponding to a future computing environment.

25. The storage medium of claim 23, wherein the instructions, when executed by the one or more processors, cause the system to cause each of the one or more knowledge engines to catalog the data representative of business regulations, governance standards, rules and/or policies according to a respective domain category.

26. The storage medium of claim 23, wherein the instructions, when executed by the one or more processors, cause the system to cause a first knowledge engine of the one or more knowledge engines to catalog the data representative of business regulations, governance standards, rules and/or policies based on past usage patterns of business regulations, standards, policies and/or rules.

27. The storage medium of claim 26, wherein the instructions, when executed by the one or more processors, cause the system to, in response to collecting new data regarding a past usage pattern, re-train the first knowledge engine.

28. The storage medium of claim 23, wherein the instructions, when executed by the one or more processors, cause the system to train the one or more first ML models by analyzing data from the plurality of knowledge repositories.

29. The storage medium of claim 23, wherein the one or more first ML models include at least one of a descriptive analytics ML model, a predictive analytics ML model, a diagnostic analytics ML model, or a prescriptive analytics ML model.

* * * * *